United States Patent
Sun et al.

(10) Patent No.: US 11,516,145 B2
(45) Date of Patent: Nov. 29, 2022

(54) PACKET CONTROL METHOD, FLOW TABLE UPDATE METHOD, AND NODE DEVICE

(71) Applicant: Huawei Technologies Co., Ltd., Shenzhen (CN)

(72) Inventors: Wenhao Sun, Nanjing (CN); Li Shen, Nanjing (CN); Xiang Yu, Nanjing (CN); José Duato, Valencia (ES)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/144,816

(22) Filed: Jan. 8, 2021

(65) Prior Publication Data
US 2021/0135999 A1 May 6, 2021

Related U.S. Application Data

(63) Continuation of application No. PCT/CN2019/094745, filed on Jul. 4, 2019.

(30) Foreign Application Priority Data

Jul. 9, 2018 (CN) .......................... 201810745523.7

(51) Int. Cl.
  *H04L 47/2441* (2022.01)
  *H04L 47/62* (2022.01)
  (Continued)

(52) U.S. Cl.
  CPC ...... *H04L 47/6255* (2013.01); *H04L 47/2441* (2013.01); *H04L 47/622* (2013.01); *H04L 47/6295* (2013.01)

(58) Field of Classification Search
  CPC ............. H04L 47/6255; H04L 47/2441; H04L 47/622; H04L 47/6295; H04L 49/1515;
  (Continued)

(56) References Cited

U.S. PATENT DOCUMENTS

| 10,554,570 B2 | 2/2020 | Xiao et al. |
| 2004/0032872 A1* | 2/2004 | Dhara ................. H04L 47/2441 370/412 |

(Continued)

FOREIGN PATENT DOCUMENTS

| CN | 102223263 A | 10/2011 |
| CN | 102377652 A | 3/2012 |

(Continued)

OTHER PUBLICATIONS

Jesus Escudero-Sahuquillo et al, "Combining Congested-Flow Isolation and Injection Throttling in HPC Interconnection Networks," 2011 International Conference on Parallel Processing, 12 pages.

(Continued)

*Primary Examiner* — Mohamed A Kamara
(74) *Attorney, Agent, or Firm* — Conley Rose, P.C.

(57) ABSTRACT

A packet control method, a flow table update method, and a node device including a first queue and a second queue, where the method includes: obtaining, by the node device, a first packet; determining, by the node device, that a data flow to which the first packet belongs is marked as an isolated flow; and if the first queue and/or the second queue meet and/or meets a first preset condition, controlling, by the node device, the first packet to enter the first queue and wait to be scheduled; or if the first queue and/or the second queue meet and/or meets a second preset condition, controlling, by the node device, the first packet to enter the second queue and wait to be scheduled.

20 Claims, 14 Drawing Sheets

(51) Int. Cl.
*H04L 47/6295* (2022.01)
*H04L 47/625* (2022.01)

(58) Field of Classification Search
CPC ..... H04L 49/1569; H04L 47/11; H04L 47/12; H04L 47/2483; H04L 47/30; H04L 47/6275
See application file for complete search history.

(56) References Cited

U.S. PATENT DOCUMENTS

| | | | |
|---|---|---|---|
| 2008/0320585 A1 | 12/2008 | Ansari et al. | |
| 2016/0191406 A1* | 6/2016 | Xiao | H04L 45/38 370/235 |
| 2017/0149675 A1 | 5/2017 | Yang | |
| 2018/0109461 A1* | 4/2018 | Shibuya | H04L 43/028 |
| 2019/0280982 A1* | 9/2019 | Shiraki | H04L 47/6255 |
| 2021/0058187 A1* | 2/2021 | Rozenboim | H04L 1/0018 |

FOREIGN PATENT DOCUMENTS

| | | |
|---|---|---|
| CN | 103338157 A | 10/2013 |
| CN | 104301185 A | 1/2015 |
| CN | 104348750 A | 2/2015 |
| CN | 106027416 A | 10/2016 |
| CN | 106708607 A | 5/2017 |
| CN | 106788911 A | 5/2017 |
| CN | 108259383 A | 7/2018 |

OTHER PUBLICATIONS

Sourav Maji et al, "A High-Speed Cheetah Flow Identification Network Function (CFINF)," 2017 IEEE Conference on Network Function Virtualization and Software Defined Networks (NFV-SDN), 8 pages.

\* cited by examiner

| Data flow identification information | Isolation identifier |
|---|---|
| Data flow identification information 1 | 1 |
| Data flow identification information 2 | 2 |
| ⋮ | |
| Data flow identification information N | 3 |
FIG. 7
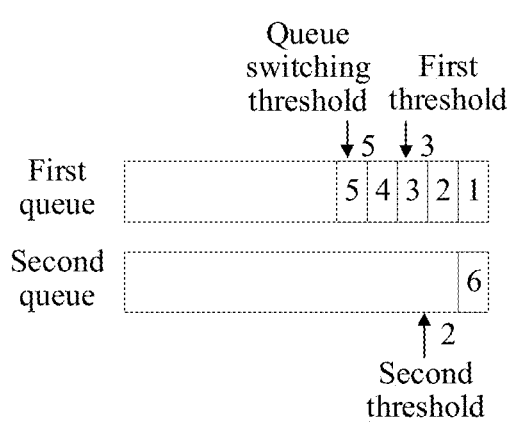
FIG. 8A
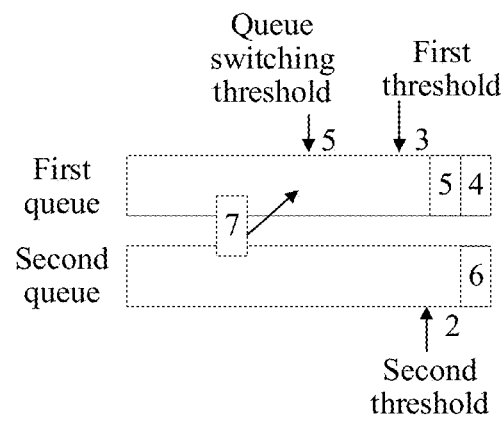
FIG. 8B

| Data flow identification information | Packet count |
|---|---|
| Data flow identification information 1 | 3 |
| Data flow identification information 2 | 5 |
| ⋮ | |
| Data flow identification information N | 3 |

| Queue identifier | Data flow identification information | Isolation identifier | Packet count |
|---|---|---|---|
| Queue 1 | Identification information 1 | 1 | 3 |
| | Identification information 2 | 1 | 5 |
| | ⋮ | | |
| Queue 2 | Identification information N | 0 | 3 |
| | ⋮ | | |

FIG. 11

PACKET CONTROL METHOD, FLOW TABLE UPDATE METHOD, AND NODE DEVICE

CROSS-REFERENCE TO RELATED APPLICATIONS

This application is a continuation of International Patent Application No. PCT/CN2019/094745, filed on Jul. 4, 2019, which claims priority to Chinese Patent Application No. 201810745523.7, filed on Jul. 9, 2018. The disclosures of the aforementioned applications are hereby incorporated by reference in their entireties.

TECHNICAL FIELD

This application relates to the field of data transmission, and in particular, to a packet control method, a flow table update method, and a node device.

BACKGROUND

With popularity of the internet, information communication becomes an indispensable part of daily life. Therefore, information (for example, service data flows) transmission between network devices gradually increases. Currently, a network device may transmit a data flow using a queue (meeting a first in first out mechanism). For example, the network device stores, in the queue, a plurality of packets of a to-be-sent data flow. After a packet at the head of the queue is dequeued, the network device sends the packet to another network device.

However, when there are a large quantity of packets of a data flow in the queue, dequeuing of a packet that is at the tail of the queue may be severely delayed, thereby causing queue congestion.

SUMMARY

Embodiments of this application provide a packet control method, a flow table update method, and a node device, to resolve a technical problem in mitigating queue congestion.

According to a first aspect, an embodiment of this application provides a packet control method. The method may be performed by a node device, and the node device is, for example, a switch or a server in a data center network. The node device includes a first queue and a second queue. The method includes: obtaining, by the node device, a first packet; determining, by the node device, that a data flow to which the first packet belongs is marked as an isolated flow; and if the first queue and/or the second queue meet and/or meets a first preset condition, controlling, by the node device, the first packet to enter the first queue and wait to be scheduled; or if the first queue and/or the second queue meet and/or meets a second preset condition, controlling, by the node device, the first packet to enter the second queue and wait to be scheduled.

In some embodiments of this application, if the data flow to which the first packet belongs is marked as an isolated flow, the node may control, based on statues and/or a status of the first queue and/or the second queue, the first packet to enter the first queue or the second queue. For example, when the first queue and/or the second queue meet and/or meets the first preset condition, the node controls the first packet to enter the first queue. When the first queue and/or the second queue meet and/or meets the second preset condition, the node controls the first packet to enter the second queue. In this way, the node can relatively flexibly control a packet of the data flow, marked as an isolated flow, to enter a queue.

In a possible design, that the first queue and/or the second queue meet and/or meets a first preset condition includes that the first queue and/or the second queue meet and/or meets one or more of the following conditions: A packet count of to-be-scheduled packets currently in the first queue is less than or equal to a first threshold; a packet count of to-be-scheduled packets currently in the first queue is less than a first threshold; a packet count of to-be-scheduled packets currently in the second queue is less than or equal to a second threshold; a packet count of to-be-scheduled packets currently in the second queue is less than a second threshold; a total packet count of to-be-scheduled packets currently in the second queue and the first queue is less than or equal to a third threshold; or a total packet count of to-be-scheduled packets currently in the second queue and the first queue is less than a third threshold.

In some embodiments of this application, the node device may determine, based on the packet counts and/or the packet count of the first queue and/or the second queue, whether the first queue and/or the second queue meet and/or meets the first preset condition. For example, when the packet count of the first queue is relatively small, to be more specific, when the first queue meets the first preset condition, the node device controls the first packet to enter the first queue. In this way, the node can relatively flexibly control a packet of the data flow to enter a queue, where the data flow is marked as an isolated flow.

In a possible design, the first threshold and/or the second threshold and/or the third threshold are and/or is less than a queue switching threshold of the first queue. If the packet count of to-be-scheduled packets currently in the first queue exceeds the queue switching threshold of the first queue, a subsequent packet of the first queue enters the second queue.

In some embodiments of this application, in this embodiment of this application, when values and/or a value of the first threshold and/or the second threshold and/or the third threshold are and/or is set on the node, reference may be made to the queue switching threshold of the first queue. For example, the first threshold may be less than the queue switching threshold of the first queue. Because the first threshold is less than the queue switching threshold of the first queue, when the packet count of packets currently stored in the first queue is less than or equal to the first threshold, it is indicated that, currently, the first queue is relatively lightly congested. After a subsequent packet of the data flow enters the first queue, a probability that the queue switching threshold of the first queue is exceeded is relatively low. To be more specific, a probability that switching to the second queue is triggered again is relatively low. In this way, accuracy of the first threshold that is set on the node device is improved.

In a possible design, the determining, by the node device, that a data flow to which the first packet belongs is marked as an isolated flow includes: querying, by the node device in a flow table, whether data flow identification information of the data flow exists; and if the data flow identification information of the data flow exists in the flow table, determining, by the node device, that the data flow is marked as an isolated flow.

In some embodiments of this application, the node device may determine, by querying the flow table, whether the first packet is marked as an isolated flow. The flow table may include only data flow identification information. To be more specific, a data flow whose data flow identification information exists in the flow table is a data flow marked as an isolated flow, and a data flow whose data flow identification information does not exist in the flow table is a non-isolated flow. In this way, the flow table is relatively simple and occupies a relatively small quantity of resources (for example, storage hardware resources).

In a possible design, the determining, by the node device, that a data flow to which the first packet belongs is marked as an isolated flow includes: if the node device finds, in a flow table, that an isolation identifier of the data flow is a first isolation identifier, determining, by the node device, that the data flow is marked as an isolated flow.

In some embodiments of this application, the node device may determine, by querying the flow table, whether the first packet is marked as an isolated flow. The flow table may include data flow identification information of each data flow and an isolation identifier corresponding to the data flow identification information. When the isolation identifier is the first isolation identifier, it is indicated that a data flow corresponding to the data flow identification information is marked as an isolated flow. Each data flow may be recorded as an isolated flow or a non-isolated flow in this flow table. This is clear and convenient for use.

In a possible design, the flow table further includes a packet count of the data flow, and after the controlling, by the node device, the first packet to enter the second queue, the method further includes: increasing, by the node device, the packet count in the flow table; and after a packet of the data flow is dequeued from the second queue, decreasing, by the node device, the packet count.

In some embodiments of this application, the node may update the flow table in real time. After a packet of a data flow is dequeued from the second queue, a packet count of the data flow is decreased. When a packet of a data flow is enqueued in the second queue, a packet count of the data flow is increased. Dynamic update of the flow table helps calculate, in real time, a packet count of packets of each data flow that are in the second queue. This is convenient for use.

In a possible design, the flow table further includes a packet count of the data flow, and after the controlling, by the node device, the first packet to enter the second queue, the method further includes: increasing, by the node device, the packet count in the flow table; and after a packet of the data flow is dequeued from the second queue, decreasing, by the node device, the packet count.

In some embodiments of this application, the node may update the flow table in real time. After a packet of a data flow is dequeued from the second queue, a packet count of the data flow is decreased. When a packet of a data flow is enqueued in the second queue, a packet count of the data flow is increased. Dynamic update of the flow table helps calculate, in real time, a packet count of packets of each data flow that are in the second queue. This is convenient for use.

In a possible design, when the packet count of the data flow is decreased to 0 in the flow table, the node device clears the data flow identification information of the data flow from the flow table.

In some embodiments of this application, the flow table may be dynamically updated. After all packets of a data flow that are in the second queue are dequeued, the node may delete information about the data flow from the flow table. This helps save hardware resources. In addition, the data flow is restored from an isolated flow to a non-isolated flow in a timely manner (a data flow whose data flow identification information does not exist in the flow table is a non-isolated flow).

In a possible design, when the packet count of the data flow is decreased to 0 in the flow table, the node device changes the first isolation identifier of the data flow into a second isolation identifier, where the second isolation identifier is used to indicate that the data flow is a non-isolated flow.

In some embodiments of this application, the flow table may be dynamically updated. After all packets of a data flow that are in the second queue are dequeued, a first isolation identifier of the data flow may be changed into a second isolation identifier. In this way, the node can restore the data flow from an isolated flow to a non-isolated flow in a timely manner.

In a possible design, the node device determines that the data flow to which the first packet belongs is marked as a non-isolated flow, and the node device controls the first packet to enter the first queue and wait to be scheduled.

In some embodiments of this application, if a data flow to which a packet belongs is marked as a non-isolated flow, the node controls the packet to enter the first queue. When a data flow to which a packet belongs is marked as an isolated flow, the node determines, based on specific statuses of the first queue and the second queue, that the packet enters the first queue or the second queue. In this way, the node can relatively flexibly control a packet of an isolated flow or a non-isolated flow to enter a queue.

In a possible design, a priority of the first queue is the same as a priority of the data flow, and a priority of the second queue is lower than the priority of the first queue.

In some embodiments of this application, the node may establish a mapping relationship between a priority of a data flow and a priority of a queue. For example, a packet of a data flow with a higher priority may enter the first queue with a higher priority, and a packet of a data flow with a lower priority may enter the second queue with a lower priority. In other approaches, a packet of a data flow with a higher priority enters a first queue, and if a packet count of packets currently in the first queue exceeds a queue switching threshold (the data flow is marked as an isolated flow), a subsequent packet of the data flow enters a second queue. Therefore, the subsequent packet of the data flow marked as an isolated flow can enter only the second queue with a lower priority. That is, the subsequent packet of the data flow with a higher priority can enter only the second queue with a lower priority. This is unfair to the data flow. However, in the embodiments of this application, the node obtains the first packet. If the data flow to which the first packet belongs is marked as an isolated flow, the node may control, based on statues and/or a status of the first queue and/or the second queue, the first packet to enter the first queue or the second queue. In other words, according to the solutions in the embodiments of this application, queue restoration of the data flow marked as an isolated flow can be implemented. To be more specific, a subsequent packet of the data flow marked as an isolated flow may enter the first queue.

In a possible design, the packet count includes a total quantity of all packets of the data flow that are in the second queue, or a total quantity of bytes occupied by all packets of the data flow that are in the second queue.

In some embodiments of this application, the packet count may be calculated in another manner. This is not limited in the embodiments of this application.

According to a second aspect, an embodiment of this application provides a flow table update method. The method may be performed by a node device, and the node device is, for example, a switch or a server in a data center network. The method includes: obtaining, by the node device, a first packet; if a data flow to which the first packet belongs is marked as an isolated flow, controlling, by the node device, the first packet to enter a first queue and wait to be scheduled; increasing, by the node device in a flow table, a first packet count of the data flow, where the first packet count is used to indicate a total packet count of packets that belong to the data flow and that are in the first queue before the first packet enters the first queue; and after a packet of the data flow is dequeued from the first queue, decreasing, by the node device, the first packet count.

In some embodiments of this application, the node may update the flow table in real time. After a packet of a data flow is dequeued from the first queue, a packet count of the data flow is decreased. When a packet of a data flow is enqueued in the first queue, a packet count of the data flow is increased. Dynamic update of the flow table helps calculate, in real time, a packet count of packets of each data flow in the first queue. This is convenient for use.

In a possible design, the method further includes: when the first packet count recorded in the flow table is decreased to 0, marking, by the node device, the data flow as a non-isolated flow.

In some embodiments of this application, the node may update the flow table in real time. When the first packet count recorded in the flow table is decreased to 0, the node device marks the data flow as a non-isolated flow. In this way, the node can restore the data flow marked as an isolated flow to a non-isolated flow in a timely manner.

In a possible design, the marking, by the node device, the data flow as a non-isolated flow includes: changing, by the node device in the flow table, a first isolation identifier corresponding to the data flow into a second isolation identifier, where the first isolation identifier is used to indicate that the data flow is an isolated flow, and the second isolation identifier is used to indicate that the data flow is a non-isolated flow.

In some embodiments of this application, if the flow table includes an isolation identifier of the data flow, when the first packet count, recorded in the flow table, of the data flow is decreased to 0, the node device changes, in the flow table, the first isolation identifier corresponding to the data flow into the second isolation identifier. In this way, the node can restore the data flow marked as an isolated flow to a non-isolated flow in a timely manner.

In a possible design, the flow table includes data flow identification information of a data flow and a packet count corresponding to the data flow identification information. The increasing, by the node device in a flow table, a first packet count of the data flow includes: determining, by the node device in the flow table, the first packet count corresponding to first data flow identification information of the data flow; and increasing, by the node device, the first packet count. After the decreasing, by the node device, the first packet count, the method further includes: when the first packet count recorded in the flow table is decreased to 0, deleting, by the node device, the first packet count and the first data flow identification information from the flow table.

In some embodiments of this application, when the first packet count, recorded in the flow table, of the data flow is decreased to 0, the node device deletes the first packet count and the first data flow identification information of the data flow from the flow table. This helps save hardware resources. In addition, an isolated flow can be restored to a non-isolated flow in a timely manner (a data flow whose data flow identification information does not exist in the flow table is a non-isolated flow).

According to a third aspect, an embodiment of this application provides a node device. The node device has functions for implementing actions of the node device in the foregoing method designs. The functions may be implemented by hardware, or may be implemented by hardware executing corresponding software. The hardware or the software includes one or more modules corresponding to the foregoing functions.

In a possible design, a structure of the node device may include an obtaining unit and a processing unit. The obtaining unit and the processing unit may perform corresponding functions in the method according to the first aspect or any possible design of the first aspect.

According to a fourth aspect, an embodiment of this application provides a node device. The node device has functions for implementing actions of the node device in the foregoing method designs. The functions may be implemented by hardware, or may be implemented by hardware executing corresponding software. The hardware or the software includes one or more modules corresponding to the foregoing functions.

In a possible design, a structure of the node device may include an obtaining unit and a processing unit. The obtaining unit and the processing unit may perform corresponding functions in the method according to the second aspect or any possible design of the second aspect.

According to a fifth aspect, a node device is provided. The node device includes: a memory configured to store computer executable program code, a transceiver, and a processor, where the processor is coupled to the memory and the transceiver. The program code stored in the memory includes an instruction. When the processor executes the instruction, the instruction enables the node device to perform the method executed by the node device in the first aspect or any possible design of the first aspect.

According to a sixth aspect, a node device is provided. The node device includes: a memory configured to store computer executable program code, a transceiver, and a processor, where the processor is coupled to the memory and the transceiver. The program code stored in the memory includes an instruction. When the processor executes the instruction, the instruction enables the node device to perform the method executed by the node device in the second aspect or any possible design of the second aspect.

According to a seventh aspect, an embodiment of this application further provides a computer readable storage medium. The computer readable storage medium includes a computer program, and when the computer program is run on a node device, the node device is enabled to perform the method in the first aspect or any possible design of the first aspect.

According to an eighth aspect, an embodiment of this application further provides a computer readable storage medium. The computer readable storage medium includes a computer program, and when the computer program is run on a node device, the node device is enabled to perform the method in the second aspect or any possible design of the second aspect.

According to a ninth aspect, an embodiment of this application provides a computer program product. When the computer program product is run on a node device, the node device is enabled to perform the method in the first aspect or any possible design of the first aspect.

According to a tenth aspect, an embodiment of this application provides a computer program product. When the computer program product is run on a node device, the node device is enabled to perform the method in the second aspect or any possible design of the second aspect.

BRIEF DESCRIPTION OF DRAWINGS

FIG. 7 is a schematic diagram of another flow table according to an embodiment of this application;

FIG. 8A and FIG. 8B are schematic diagrams of a process in which a packet enters a first queue or a second queue according to an embodiment of this application;

FIG. 11 is a schematic diagram of yet another flow table according to an embodiment of this application;

DESCRIPTION OF EMBODIMENTS

The following describes the technical solutions in the embodiments of this application with reference to the accompanying drawings in the embodiments of this application.

In the following, some terms in this application are described, to help a person skilled in the art have a better understanding.

A node device in the embodiments of this application includes a device that can perform network communication, for example, a device having a communications function, such as a base station (for example, an access point) or a terminal device (which may also be referred to as a user equipment (UE)). This is not limited in the embodiments of the present disclosure. The terminal device includes a device such as a mobile phone (also referred to as a "cellular" phone), an in-vehicle mobile apparatus, an intelligent wearable device, a personal digital assistant (PDA), a smart watch, a smart helmet, smart glasses, or a smart band. The base station may include an evolved NodeB (eNB, e-NodeB, or evolutional Node B) in a Long-Term Evolution (LTE) system or an LTE Advanced (LTE-A) system, or may include a next generation NodeB (gNB) in a $5^{th}$ generation (5G) system. This is not limited in the embodiments of the present disclosure.

It should be noted that the node device mentioned in the embodiments of this application may alternatively be another node device (for ease of description, the node device is referred to as a node for short in the following). For example, the node device may further include any device in a data center network or in a network other than a data center network. The device may be a device such as a switch, a router, or a network adapter. The data center network or the network other than a data center network may have a plurality of network architectures, such as a Clos architecture, a mesh architecture, or a torus architecture. This is not limited in the embodiments of this application. For ease of description, only a data center network having a Clos architecture is used as an example for description in the following.

Figure 1:
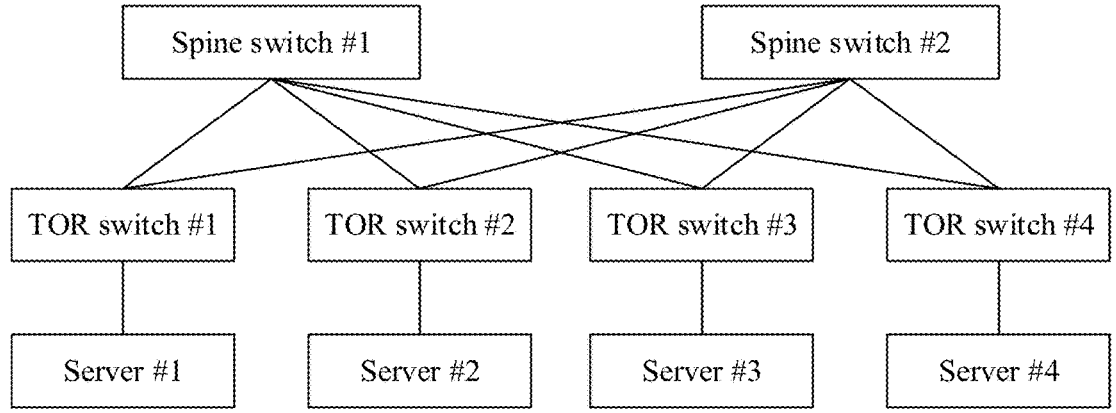
FIG. 1 is a schematic diagram of a data center network according to an embodiment of this application.

FIG. 1 is a schematic diagram of a data center network having a Clos architecture. In FIG. 1, an example in which the data center network is a two-stage Clos network is used. As shown in FIG. 1, the data center network may include a server configured to provide various services. In addition to the server, the data center network further includes many different types of switches such as a top-of-rack (TOR) switch and a spine switch. The TOR switch may be disposed on a link between the server and the spine switch. An upstream port of the TOR switch is configured to connect to the spine switch, and a downstream port of the TOR switch is configured to connect to the server. Each TOR switch may be connected to a plurality of spine switches using a plurality of upstream ports. Each server may be connected to at least one TOR switch using at least one network adapter.

Figure 2:
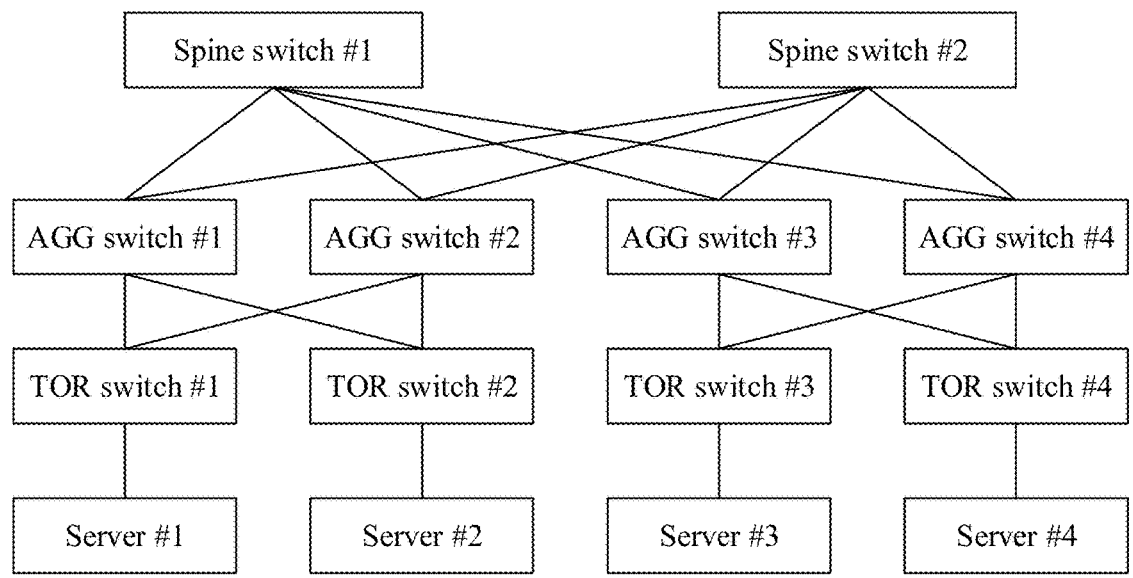
FIG. 2 is a schematic diagram of another data center network according to an embodiment of this application.

When the data center is relatively large in scale and includes a relatively large quantity of servers and TOR switches, an aggregation (AGG) switch may be further disposed on a link between the TOR switch and the spine switch (referring to FIG. 2, in FIG. 2, an example in which the data center network is a three-stage Clos network is used). A downstream port of the AGG switch is configured to connect to at least one TOR switch, and an upstream port of the AGG switch is configured to connect to at least one spine switch.

A data flow in the embodiments of this application includes at least one packet. Information exchange between two nodes is usually data flow transmission between the two nodes. For example, a transmit end node separately sends a plurality of packets of a data flow to a receive end node. After receiving the plurality of packets, the receive end node integrates the plurality of packets into the data flow.

Identification information of a data flow in the embodiments of this application is information or an information combination that may be used to identify the data flow. Based on the identification information, a node may identify the unique data flow corresponding to the identification information. For example, a data flow may include a plurality of packets, and each packet may include a 5-tuple including a source Internet Protocol (IP), a destination IP, a protocol number, a source port number, and a destination port number, for example, an overlay network. If a plurality of packets each include a same 5-tuple, the plurality of packets belong to a same data flow. Certainly, each packet may alternatively include a 3-tuple or another type of information or information combination, for example, each packet may alternatively include a 6-tuple. Using a Virtual Extensible Local Area Network (VXLAN) as an example, each packet may include a 6-tuple including a source IP, a destination IP, a protocol number, a source port number, a destination port number, and a VXLAN network identifier (VNI). If a plurality of packets each include a same 6-tuple, the plurality of packets belong to a same data flow. A quantity of tuples of a packet is not limited in the embodiments of this application.

"A plurality of" in this application refers to two or more than two.

In addition, it should be understood that in the descriptions of this application, terms such as "first" and "second" are merely used for differentiation and description, but should not be understood as indicating or implying relative importance, or should not be understood as indicating or implying a sequence.

The following describes a background technology related to this application.

Currently, when transmitting a data flow, a node may perform scheduling using a queue (meeting a first-in, first-out mechanism). For example, the node stores, in the queue, a plurality of packets of a to-be-sent data flow. After a packet at the head of the queue is dequeued, the node sends the packet to another node. However, when there are a large quantity of packets of a data flow in the queue, dequeuing of a packet that is at the tail of the queue may be severely delayed, thereby causing queue congestion.

To minimize queue congestion, a node may currently use a congestion isolation (CI) technology. To be more specific, when a total packet count of packets of a data flow that are in a queue exceeds a queue switching threshold, the node marks the data flow as an isolated flow. When a data flow is marked as an isolated flow, a subsequent packet of the data flow is stored in a second queue.

Figure 3A:
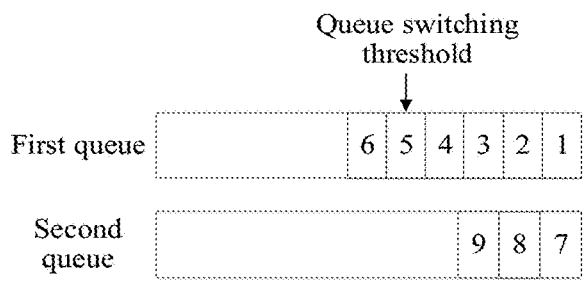
FIG. 3A and FIG. 3B are schematic diagrams of queue congestion isolation according to an embodiment of this application.
Figure 3B:
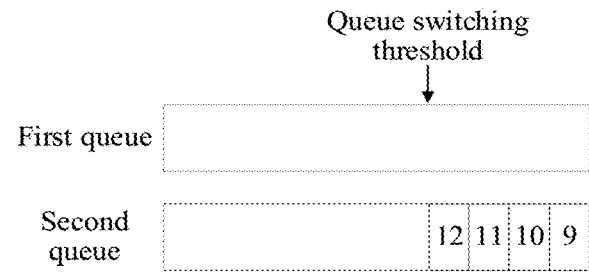

For example, refer to FIG. 3A and FIG. 3B. As shown in FIG. 3A, after a packet 1 to a packet 6 of a data flow enter a first queue, a packet count of the first queue exceeds a queue switching threshold (the queue switching threshold is 5) of the first queue, and the data flow is marked as an isolated flow. To be more specific, subsequent packets (for example, a packet 7 to a packet 9) of the data flow enter a second queue. If there is an additional subsequent packet of the data flow, the additional packet also enters the second queue. Therefore, for the data flow marked as an isolated flow, all subsequent packets of the data flow are transmitted using the second queue. This manner is relatively monotonous and lacks flexibility. For example, referring to FIG. 3B, if the first queue currently is not congested (for example, the first queue is empty) or relatively lightly congested (for example, a packet count of packets currently in the first queue is relatively small), a subsequent packet of the data flow marked as an isolated flow can still enter only the second queue. That is, the first queue is idle but is not properly used.

In an embodiment of this application, a node may include a first queue and a second queue, and the node obtains a first packet. If a data flow to which the first packet belongs is marked as an isolated flow, the node may control, based on statues and/or a status of the first queue and/or the second queue, the first packet to enter the first queue or the second queue. For example, when the first queue and/or the second queue meet and/or meets a first preset condition, the node controls the first packet to enter the first queue. When the first queue and/or second queue meet and/or meets a second preset condition, the node controls the first packet to enter the second queue. This is different from that all packets of a data flow marked as an isolated flow can enter only the second queue. In this way, the node can relatively flexibly control a data flow, marked as an isolated flow, to enter a queue.

Figure 4:
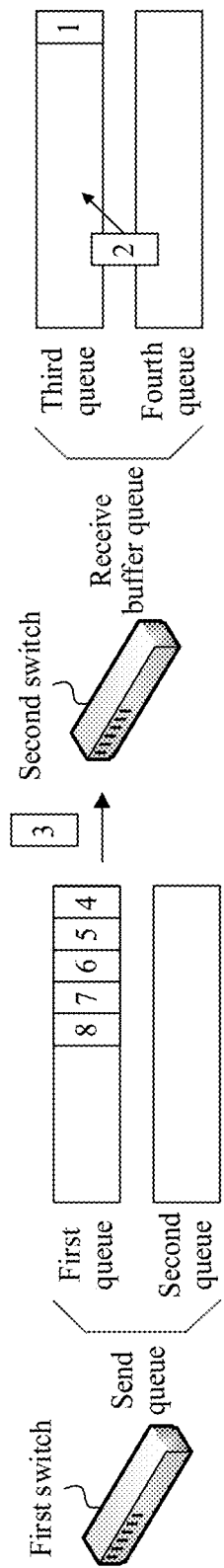
FIG. 4 is a schematic diagram of an application scenario according to an embodiment of this application.

An application scenario of this embodiment of this application may be the data center network shown in FIG. 1 or FIG. 2, or may be another data center network or a network other than a data center network. For ease of description of a solution of this application, FIG. 4 shows a simple application scenario. In FIG. 4, an example in which the application scenario includes two nodes and the two nodes are a first switch and a second switch is used. The first switch and the second switch in FIG. 4 may be any two adjacent switches in FIG. 1 or FIG. 2. It should be understood that FIG. 4 is merely an example of the application scenario. In an actual application, a node is not limited to a switch.

The first switch sends a packet of a data flow to the second switch using a send queue, and the second switch receives, using a receive buffer queue, the packet that is of the data flow and that is sent by the first switch. Send queues of the first switch includes two queues: a first queue and a second queue. After the first switch obtains a first packet, if a data flow to which the first packet belongs is marked as an isolated flow, the node device may control, based on statues and/or a status of the first queue and/or the second queue, the first packet to enter the first queue or the second queue. Similarly, receive buffer queues of the second switch includes two queues: a third queue and a fourth queue. After the second switch receives the first packet sent by the first switch, if the data flow to which the first packet belongs is marked as an isolated flow, the second switch may control, based on statues and/or a status of the third queue and/or the fourth queue, the first packet to enter the third queue or the fourth queue.

The following describes the technical solutions provided in the embodiments of the present disclosure with reference to the accompanying drawings. In the following description process, an example in which the technical solutions provided in the present disclosure are applied to the application scenario shown in FIG. 4 is used.

Figure 5:
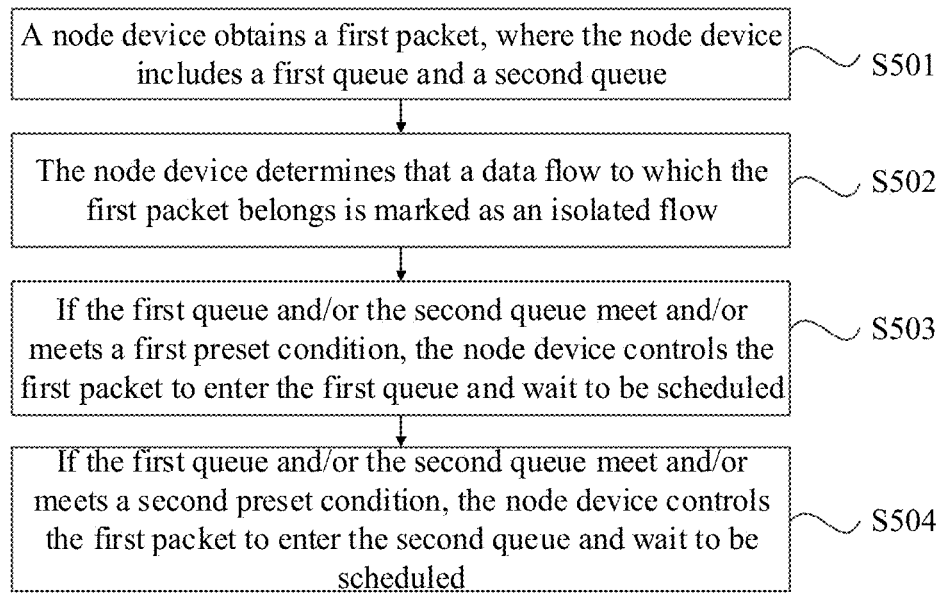
FIG. 5 is a schematic flowchart of a packet control method according to an embodiment of this application.

Referring to FIG. 5, an embodiment of the present disclosure provides a packet control method. A process of the method is described in the following.

S501: A node obtains a first packet, where the node includes a first queue and a second queue.

In this embodiment of this application, the node may obtain the first packet in a plurality of manners. For example, the node may generate the first packet (for example, when the node is a source from which a data flow is sent, the node may generate the first packet). For another example, the node may receive the first packet sent by another node. An example in which the node is the second switch shown in FIG. 4 is used, and the second switch may receive the first packet sent by the first switch.

In this embodiment of this application, the node includes two queues: the first queue and the second queue. The node may be the first switch or the second switch shown in FIG. 2. If the node is the first switch, the first queue and the second queue are the send queues. If the node is the second switch, the first queue and the second queue are the receive buffer queues. That is, the first queue and the second queue in this embodiment of this application may be send queues of the node, or may be receive buffer queues of the node. In this embodiment of this application, the first queue may refer to one queue, or may refer to a plurality of queues. Similarly, the second queue may refer to one queue, or may refer to a plurality of queues. This is not limited in this embodiment of this application.

In this embodiment of this application, a priority of the first queue may be different from a priority of the second queue. An example in which the priority of the first queue is higher than the priority of the second queue is used. The node may preferentially process a packet in a queue with a higher priority. The node may assign different priorities to data flows of different services based on urgency degrees of the services. For example, a data flow of a relatively urgent service (for example, a service requiring a low latency) has a higher priority, and a data flow of a non-urgent service (for example, a service having no requirement on latency) has a lower priority. The node may establish a mapping relationship between a priority of a data flow and a priority of a queue. For example, a packet of a data flow with a higher priority may enter the first queue with a higher priority, and a packet of a data flow with a lower priority may enter the second queue with a lower priority. In this example, the packet of the data flow with a higher priority enters the first queue, and if a packet count of packets currently in the first queue exceeds a queue switching threshold, a subsequent packet of the data flow enters the second queue.

In other approaches, a packet of a data flow with a higher priority enters a first queue, and if a packet count of packets currently in the first queue exceeds a queue switching threshold, a subsequent packet of the data flow enters a second queue. Therefore, the subsequent packet of the data flow marked as an isolated flow can enter only the second queue with a lower priority. That is, the subsequent packet of the data flow with a higher priority can enter only the second queue with a lower priority. This is unfair to the data flow. However, in this embodiment of this application, the node obtains the first packet. If a data flow to which the first packet belongs is marked as an isolated flow, the node may control, based on statues and/or a status of the first queue and/or the second queue, the first packet to enter the first queue or the second queue. In other words, according to the solution in this embodiment of this application, queue restoration of the data flow marked as an isolated flow can be implemented. To be more specific, a subsequent packet of the data flow marked as an isolated flow may enter the first queue.

In this embodiment of this application, the priority of the first queue may alternatively be the same as the priority of the second queue. For example, the first queue is used as a primary queue, and the second queue is used as a secondary queue. A packet of a data flow first enters the first queue, and if a packet count of packets currently in the first queue exceeds a queue switching threshold, a subsequent packet of the data flow enters the second queue.

After the node obtains the first packet, the node may control, based on whether the data flow to which the first packet belongs is marked as an isolated flow, the first packet to enter the first queue or the second queue.

S502: The node determines that the data flow to which the first packet belongs is marked as an isolated flow.

In this embodiment of this application, there may be a plurality of causes that a data flow to which a packet belongs is marked as an isolated flow.

Example 1: After a packet of a data flow enters the first queue, if a packet count of packets currently in the first queue exceeds a queue switching threshold of the first queue, the node marks the data flow as an isolated flow. In other words, a subsequent packet of the data flow enters the second queue. Example 2: After a packet of a data flow enters the first queue, the node may determine whether a quantity of bytes occupied by the data flow to which the packet belongs is greater than a preset byte quantity (an elephant flow). If yes, the node may mark the data flow as an isolated flow. In other words, a subsequent packet of the data flow enters the second queue. Example 3: If a plurality of packets of a dataflow consecutively enter the first queue in a relatively short period, the node may mark the data flow as an isolated flow.

Figure 6:
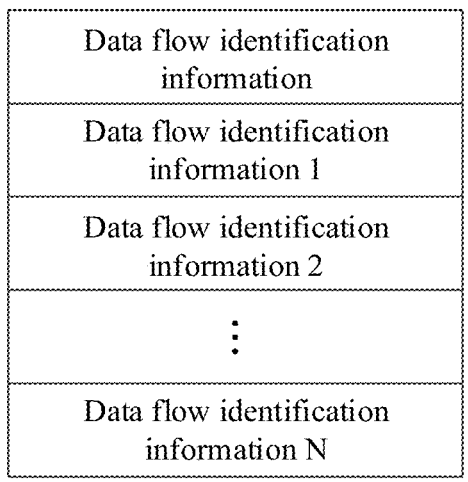
FIG. 6 is a schematic diagram of a flow table according to an embodiment of this application.

In this embodiment of this application, the node may mark a data flow as an isolated flow using a flow table record. In a possible implementation, referring to the foregoing example 1, after a packet of a data flow enters the first queue, if a packet count of packets currently in the first queue exceeds the queue switching threshold of the first queue, the node adds identification information of the data flow into a flow table. That is, the data flow is marked as an isolated flow. After a packet of another data flow enters the first queue, if a packet count of packets currently in the first queue does not exceed the queue switching threshold of the first queue, the node does not add identification information of the data flow into the flow table. In this way, the flow table includes only identification information of an isolated flow. To be more specific, a data flow whose data flow identification information exists in the flow table is a data flow marked as an isolated flow, and a data flow whose data flow identification information does not exist in the flow table is a non-isolated flow. For example, FIG. 6 is a schematic diagram of a possible flow table according to an embodiment of this application. In FIG. 6, the flow table includes data flow identification information.

It should be understood that when the node is started, the flow table may be empty or does not exist. When a packet of a data flow enters the first queue, and a packet count of packets currently in the first queue exceeds the queue switching threshold of the first queue, the node device creates a flow table and adds data flow identification information of the data flow into the created flow table, or the node device adds data flow identification information of the data flow into the existing empty flow table.

In another possible implementation, the node stores data flow identification information of each data flow in the flow table, where each piece of data flow identification information corresponds to one isolation identifier. The isolation identifier is used to indicate whether a data flow corresponding to the isolation identifier is an isolated flow or a non-isolated flow. For example, when the isolation identifier is 1, the isolation identifier is used to indicate that the data flow corresponding to the isolation identifier is an isolated flow. When the isolation identifier is 0, the isolation identifier is used to indicate that the data flow corresponding to the isolation identifier is a non-isolated flow. Certainly, in addition to 1 and 0, the isolation identifier may alternatively be indicated in another manner, for example, may be represented using words "isolated flow" and "non-isolated flow". This is not limited in this embodiment of this application. Referring to the foregoing example 1, after a packet of a data flow enters the first queue, if a packet count of packets currently in the first queue exceeds the queue switching threshold of the first queue, the node marks an isolation identifier of the data flow as 1 in the flow table. After a packet of another data flow enters the first queue, if a packet count of packets currently in the first queue does not exceed the queue switching threshold of the first queue, the node marks an isolation identifier of the data flow as 0 in the flow table. In this way, the flow table includes the data flow identification information and the isolation identifier of each data flow. For example, FIG. 5 is a schematic diagram of another possible flow table according to an embodiment of this application. In FIG. 7, the flow table includes the data flow identification information and the isolation identifier of each data flow.

In this embodiment of this application, after the node obtains the first packet, the node may determine, based on information carried in the packet (for example, each packet may carry data flow identification information of a data flow to which the packet belongs), the data flow to which the first packet belongs, and then the node determines whether the data flow to which the first packet belongs is marked as an isolated flow.

For example, data flow identification information of a data flow of a service may be set, based on a type of the service, on the node. For example, data flow identification information of a data flow of a web search service is "data flow identification information 1". For another example, data flow identification information of a data flow of an emergency call service is "data flow identification information 2". The "data flow identification information 1" and the "data flow identification information 2" herein are merely examples. In an actual application, data flow identification information may be named in a plurality of manners. For example, the data flow identification information may be a binary number, and one binary number corresponds to one service type. Generally, a data flow may include a plurality of packets. In this way, the plurality of packets of the data flow each carry data flow identification information of the data flow. For example, all packets of the data flow of the web search service each carry the "data flow identification information 1", and all packets of the data flow of the emergency call service each carry the "data flow identification information 2". Because a data flow may have more than one packet, to distinguish between different packets, each packet may further carry a packet identifier. For example, the data flow of the web search service has a total of 10 packets, and a first packet carries the data flow identification information, that is, the "data flow identification information 1", and a packet identifier of the first packet.

It can be learned from the foregoing content that, the node may mark a data flow as an isolated flow using the flow table record. Therefore, after the node obtains the first packet and determines, based on the information carried in the packet, the data flow to which the first packet belongs, the node may determine, by querying the flow table, that the data flow is marked as an isolated flow.

For example, still refer to FIG. 6. In FIG. 6, the flow table includes data flow identification information. After the node determines the data flow to which the first packet belongs, the node queries, in the flow table shown in FIG. 6, whether identification information of the data flow to which the first packet belongs exists. If yes, the data flow to which the first packet belongs is marked as an isolated flow. If no, the data flow to which the first packet belongs is not marked as an isolated flow, that is, the data flow is marked as a non-isolated flow. In this way, a data flow whose data flow identification information exists in the flow table is an isolated flow, and a data flow whose data flow identification information does not exist in the flow table is a non-isolated flow. The flow table is relatively simple, and occupies a relatively small quantity of resources (for example, storage hardware resources).

For another example, still refer to FIG. 7. In FIG. 7, the flow table includes data flow identification information and an isolation identifier. After the node determines the data flow to which the first packet belongs, the node queries, in the flow table shown in FIG. 5, an isolation identifier corresponding to the identification information of the data flow to which the first packet belongs. If it is found that the isolation identifier is 1, the data flow to which the first packet belongs is an isolated flow. If it is found that the isolation identifier is 0, the data flow to which the first packet belongs is a non-isolated flow.

After the node determines that the data flow to which the first packet belongs is marked as a non-isolated flow, the node controls the first packet to enter the first queue. After the node determines that the data flow to which the first packet belongs is marked as an isolated flow, the node may control, based on statues and/or a status of the first queue and/or the second queue, the first packet to enter the first queue or the second queue.

S503: If the first queue and/or the second queue meet and/or meets a first preset condition, the node controls the first queue to enter the first queue and wait to be scheduled.

In this embodiment of this application, there may be a plurality of cases in which the first queue and/or the second queue meet and/or meets the first preset condition. The following uses an example for description.

In a first case, the first queue meets the first preset condition. For example, a packet count of to-be-scheduled packets currently in the first queue is relatively small. That is, the first queue meets the first preset condition.

In this embodiment of this application, a first threshold may be stored on the node. When the packet count of packets currently in the first queue is less than or equal to the first threshold, the node determines that the first queue meets the first preset condition. Alternatively, when the packet count of packets currently in the first queue is less than a first threshold, the node determines that the first queue meets the first preset condition. In this embodiment of this application, the first threshold may be set before delivery of the node, or may be set by a user during use. In this way, when the packet count of packets currently in the first queue is less than or equal to the first threshold, it is indicated that, currently, the first queue is relatively lightly congested. The node may control a subsequent packet of a data flow, marked as an isolated flow, to enter the first queue.

In this embodiment of this application, when a value of the first threshold is set on the node, reference may be made to the queue switching threshold of the first queue. For example, the first threshold may be less than the queue switching threshold of the first queue (it can be learned from the foregoing content that when the packet count of to-be-scheduled packets currently in the first queue exceeds the queue switching threshold of the first queue, a subsequent packet of the first queue enters the second queue).

For example, refer to FIG. 8A and FIG. 8B. As shown in FIG. 8A, when a packet 1 to a packet 5 of a data flow enter the first queue, because the queue switching threshold of the first queue is 5, the data flow is marked as an isolated flow. To be more specific, a subsequent packet (for example, a packet 6) of the data flow enters the second queue. As shown in FIG. 8B, packets in the first queue are gradually dequeued. When there are currently two remaining packets (the packet 5 and the packet 6) in the first queue, a current packet count is less than the first threshold (the first threshold is 3). In this case, a subsequent packet (for example, a packet 7) of the data flow marked as an isolated flow may enter the first queue. In this way, because the first threshold is less than the queue switching threshold of the first queue, when the packet count of packets currently in the first queue is less than or equal to the first threshold, it is indicated that, currently, the first queue is relatively lightly congested. After the subsequent packet of the data flow enters the first queue, a probability that the queue switching threshold of the first queue is exceeded is relatively low. To be more specific, a probability that switching to the second queue is triggered again is relatively low.

In a second case, the second queue meets the first preset condition. For example, a packet count of to-be-scheduled packets currently in the second queue is relatively small. That is, the second queue meets the first preset condition.

In this embodiment of this application, a second threshold may be stored on the node. When the packet count of packets currently in the second queue is less than or equal to the second threshold, the node determines that the second queue meets the first preset condition. Alternatively, when the packet count of packets currently in the second queue is less than the second threshold, the node determines that the second queue meets the first preset condition. In this embodiment of this application, the second threshold may be set before delivery, or may be set by a user during use. In this way, when the packet count of packets currently in the second queue is less than or equal to the second threshold, it is indicated that the packet count of packets currently in the second queue is relatively small. To clear the packets in the second queue as soon as possible, the node may control a packet of a data flow, marked as an isolated flow, to enter the first queue.

It can be learned from the flow table shown in FIG. 6 that, this is because that identification information of a data flow in the second queue is recorded in the flow table. If all packets of a data flow can be dequeued from the second queue as soon as possible, the node may delete identification information of the data flow from the second queue. This saves hardware resources. In addition, because the identification information of the data flow does not exist in the flow table, the data flow is restored from an isolated flow to a non-isolated flow. In this way, the node can restore the data flow marked as an isolated flow to a non-isolated flow in a timely manner. (This part of content is described in detail in another embodiment).

In this embodiment of this application, when the second threshold is set on the node, reference may be made to the queue switching threshold of the first queue. For example, the second threshold may be less than the queue switching threshold of the first queue. Still using FIG. 8A and FIG. 8B as an example, the queue switching threshold of the first queue is 5, and the second threshold is 2. When a packet count of packets currently in the second queue is less than the second threshold (the second threshold is 2), the node controls a packet of a data flow, marked as an isolated flow, to enter the first queue.

In a third case, the first queue and the second queue meet the first preset condition. For example, a total packet count of to-be-scheduled packets currently in the first queue and the second queue is relatively small. That is, the first queue and the second queue meet the first preset condition.

In this embodiment of this application, a third threshold may be stored on the node. When the packet count of to-be-scheduled packets currently in the first queue and the second queue is less than or equal to the third threshold, the node determines that the first queue and the second queue meet the first preset condition. Alternatively, when the packet count of to-be-scheduled packets currently in the first queue and the second queue is less than the third threshold, the node determines that the first queue and the second queue meet the first preset condition. In this embodiment of this application, the third threshold may be set before delivery of the node, or may be set by a user during use. In this way, when a sum of the packet count of packets currently in the first queue and the packet count of packets currently in the second queue is less than or equal to the third threshold, it is indicated that, currently, the first queue and the second queue are relatively lightly congested. The node may control a packet of a data flow, marked as an isolated flow, to enter the first queue.

In this embodiment of this application, when the third threshold is set on the node, reference may be made to the queue switching threshold of the first queue. For example, the third threshold may be less than the queue switching threshold of the first queue. Still using FIG. 8B as an example, the queue switching threshold of the first queue is 5, and the third threshold may be 4. When a total packet count (that is, 3) of packets currently in the first queue and the second queue is less than the third threshold (the third threshold is 4), the node controls a packet of a data flow, marked as an isolated flow, to enter the first queue.

S504: If the first queue and/or the second queue meet and/or meets a second preset condition, the node controls the first packet to enter the second queue and wait to be scheduled.

In this embodiment of this application, there may be a plurality of cases in which the first queue and/or the second queue meet and/or meets the second preset condition. The following separately provides descriptions.

In a first case, the first queue meets the second preset condition. To be more specific, a packet count of to-be-scheduled packets currently in the first queue is greater than a fourth threshold. The fourth threshold may be greater than or equal to the first threshold.

In a second case, the second queue meets the second preset condition. To be more specific, a packet count of to-be-scheduled packets currently in the second queue is greater than a fifth threshold. The fifth threshold may be greater than or equal to the second threshold.

In a third case, the first queue and the second queue meet the second preset condition. To be more specific, a total packet count of to-be-scheduled packets currently in the first queue and the second queue is greater than a sixth threshold. The sixth threshold may be greater than or equal to the third threshold.

It can be learned from the foregoing description that, in this embodiment of this application, the node may include the first queue and the second queue, and the node obtains the first packet. If the data flow to which the first packet belongs is marked as an isolated flow, the node may control, based on statues and/or a status of the first queue and/or the second queue, the first packet to enter the first queue or the second queue. For example, when the first queue and/or the second queue meet and/or meets the first preset condition, the node controls the first packet to enter the first queue. When the first queue and/or the second queue meet and/or meets the second preset condition, the node controls the first packet to enter the second queue. In this way, the node can flexibly control the packet of the data flow, marked as an isolated flow, to enter the first queue or the second queue.

In the embodiment shown in FIG. 5, the node determines, using the flow table, that the data flow to which the first packet belongs is marked as an isolated flow or a non-isolated flow. The following describes another embodiment. In this embodiment, how a node updates a flow table is described.

Figures 9, 10:
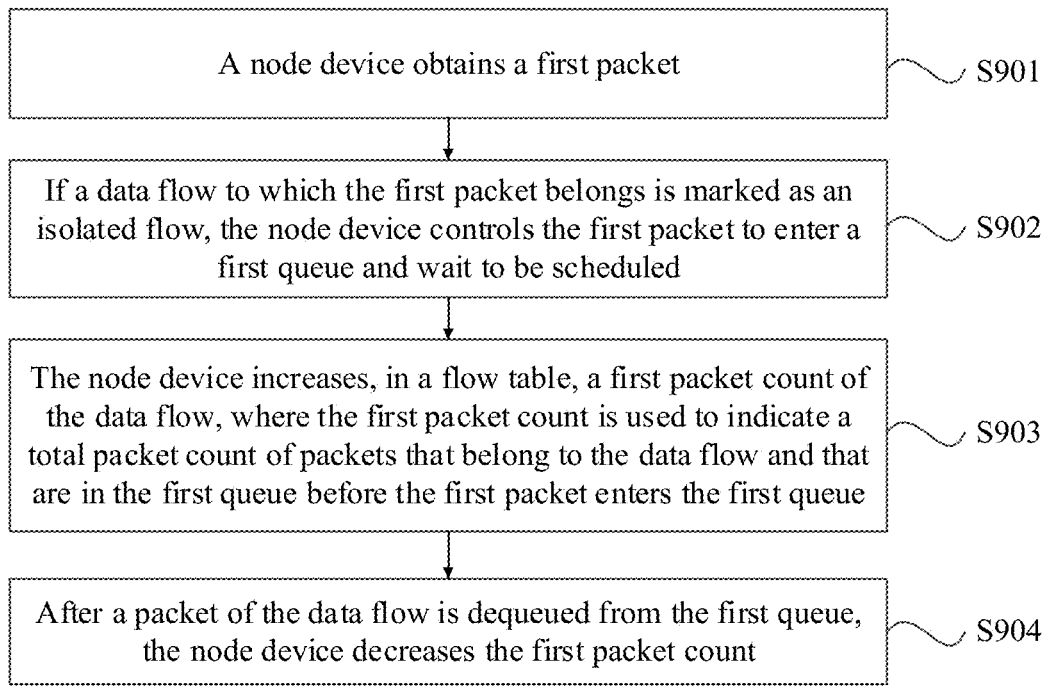
FIG. 9 is a schematic flowchart of a flow table update method according to an embodiment of this application.
FIG. 10 is a schematic diagram of still another flow table according to an embodiment of this application.

Referring to FIG. 9, an embodiment of the present disclosure provides a flow table update method. A process of the method is described in the following.

S901: A node obtains a first packet.

S902: If a data flow to which the first packet belongs is marked as an isolated flow, the node controls the first packet to enter a first queue and wait to be scheduled.

In this embodiment, after a data flow to which a packet belongs enters a second queue, if a packet count of packets currently in the second queue exceeds a queue switching threshold of the second queue, the data flow is marked as an isolated flow. In other words, a subsequent packet of the data flow enters the first queue. (It should be understood that, in this embodiment, the first queue is the second queue in the embodiment shown in FIG. 5, and the second queue is the first queue in the embodiment shown in FIG. 5.)

S903: The node increases, in a flow table, a first packet count of the data flow, where the first packet count is used to indicate a total packet count of packets that belong to the data flow and that are in the first queue before the first packet enters the first queue.

S904: After a packet of the data flow is dequeued from the first queue, the node decreases the first packet count.

In this embodiment of this application, the node may calculate a packet count of packets currently in the first queue or the second queue. For example, the node may add an entry of a packet count (for example, a packet count, corresponding to the first queue or the second queue, of each data flow) to the foregoing flow table (for example, the flow table shown in FIG. 6 or FIG. 8A and FIG. 8B). The node may calculate only a packet count of packets currently in the first queue, or record only a packet count of packets currently in the second queue, or calculate a packet count of packets currently in each of the first queue and the second queue.

In a first case, the node calculates only the packet count of packets currently in the first queue. In other words, the node calculates only a packet count of a data flow marked as an isolated flow. FIG. 10 is a schematic diagram of a possible flow table according to an embodiment of this application. As shown in FIG. 8A and FIG. 8B, the flow table includes data flow identification information and a corresponding packet count.

When calculating the packet count of packets currently in the first queue, the node may respectively calculate when a packet is enqueued in or dequeued from the first queue. For example, after a packet of a data flow enters the first queue, the node may determine first data flow identification information of the data flow, and then queries, in the flow table shown in FIG. 8A and FIG. 8B, a first packet count corresponding to the first data flow identification information. For example, if the data flow identification information of the data flow is "data flow identification information 1", the node increases a first packet count corresponding to the "data flow identification information 1". For another example, after a packet of a data flow is dequeued from the first queue, the node determines first data flow identification information of the data flow, and then queries, in the flow table shown in FIG. 10, a first packet count corresponding to the first data flow identification information. For example, if the data flow identification information of the data flow is "data flow identification information 1", the node decreases a first packet count corresponding to the "data flow identification information 1".

In the first case, because the flow table records only the packet count of packets currently in the first queue, to save resources, a queue identifier of the first queue does not need to be added to the flow table. Certainly, in an actual application, the queue identifier of the first queue may alternatively be added to the flow table. This is not limited in this embodiment of this application.

In a second case, the node calculates the packet count of packets currently in each of the first queue and the second queue.

FIG. 11 is a schematic diagram of a possible flow table according to an embodiment of this application. As shown in FIG. 11, the flow table includes a queue identifier, data flow identification information, an isolation identifier, and a packet count. A queue identifier of the first queue is a queue 1, and a queue identifier of the second queue is a queue 2. The first queue includes a data flow 1 and a data flow 2. An isolation identifier is 1, it is indicated that the data flow 1 and the data flow 2 are isolated flows.

When a packet enters the first queue, if identification information of a data flow to which the packet belongs exists in the flow table shown in FIG. 11, the node increases a packet count corresponding to the identification information of the data flow. If identification information of a data flow to which the packet belongs does not exist in the flow table shown in FIG. 11, the node adds the identification information of the data flow, and adds a packet count corresponding to the identification information of the data flow. When a packet is dequeued from the first queue, the node decreases a packet count of a data flow to which the packet belongs. Similarly, this is also applicable to the second queue.

In this embodiment of this application, the packet count may be a quantity of packets, or a quantity of bytes occupied by a packet, or may be in another form. This is not limited in this embodiment of this application. For example, the packet count is a quantity of packets. After a packet enters the first queue, the node increases the packet count by 1. After a packet is dequeued from the first queue, the node decreases the packet count by 1. For example, the packet count is a quantity of bytes occupied by a packet. After a packet enters the first queue, the node increases the packet count by a quantity of bytes occupied by the packet. After a packet is dequeued from the first queue, the node decreases the packet count by a quantity of bytes occupied by the packet.

In a third case, the node calculates only the packet count of packets currently in the second queue. In other words, the node calculates only a packet count of a data flow marked as a non-isolated flow. This is similar to the first case, and for brevity of this specification, details are not described herein.

After all packets of a data flow that are in a queue are dequeued, in other words, a packet count of the data flow is 0, the node may delete related information of the data flow from the flow table.

If the flow table is the flow table shown in FIG. 10, after all packets of the data flow whose data flow identification information is the "data flow identification information 1" are dequeued from the second queue, in other words, the packet count corresponding to the data flow identification information 1 is 0, the node may delete related information of the data flow from the flow table, for example, delete a first line from the flow table. It can be learned from the foregoing content that, a data flow whose data flow identification information exists in the flow table shown in FIG. 10 is an isolated flow, and a data flow whose data flow identification information does not exist in the flow table shown in FIG. 10 is a non-isolated flow. Therefore, after all packets of a data flow in the first queue are dequeued, the node deletes information of the data flow from the flow table. That is, the data flow is changed from an isolated flow to a non-isolated flow. In other words, a subsequent packet of the data flow enters the second queue. That is, a status restoration process (from an isolated flow to a non-isolated flow) of the data flow is completed.

Figure 12A:
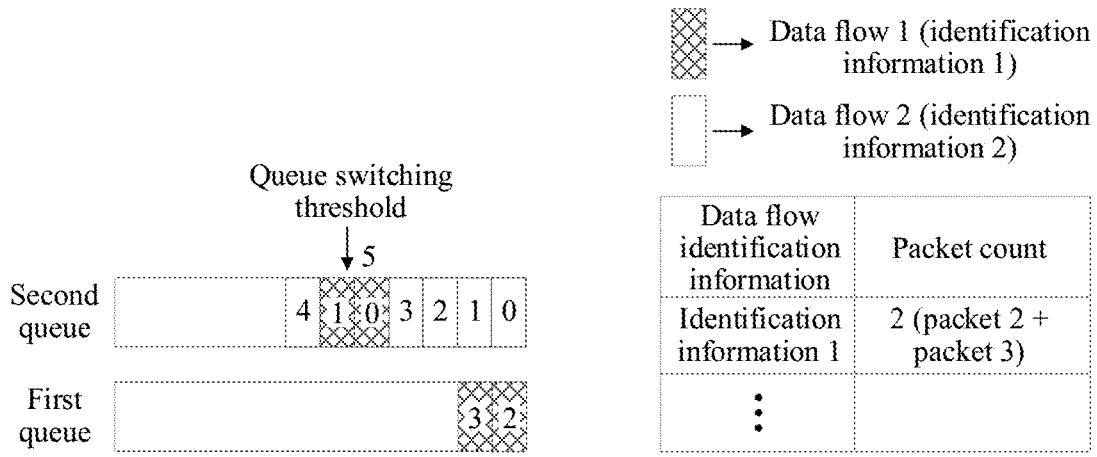
FIG. 12A, FIG. 12B, FIG. 12C, and FIG. 12D are schematic diagrams of a flow table update process according to an embodiment of this application.

For example, referring to FIG. 12A, after packets (non-shaded boxes in the figure) (a packet 0 to a packet 3) of a data flow 2 enters the second queue, packets (shaded boxes in the figure) (a packet 0 and a packet 1) of a data flow 1 enters the second queue. After the packet 1 of the data flow 1 enters the second queue, a packet count of packets currently in the second queue exceeds the queue switching threshold of the second queue (the queue switching threshold is 5). The node adds identification information and a packet count of the data flow 1 to the flow table (the data flow 1 is marked as an isolated flow). For example, subsequent packets (for example, a packet 2 and a packet 3) of the data flow 1 enter the first queue. The node adds the packet count of the data flow 1 to the flow table. To be more specific, the packet count corresponding to the data flow identification information 1 in the flow table is 2 (the packet 2+the packet 3).

Figure 12B:
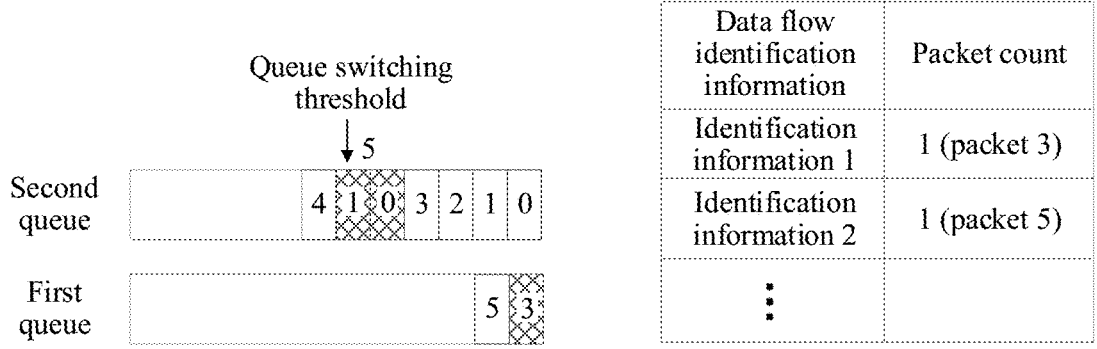

In this case, a packet 4 of the data flow 2 enters the second queue, and packets currently in the second queue still exceed the queue switching threshold. Therefore, the node adds data flow identification information 2 and a packet count of the data flow 2 to the flow table. In other words, the data flow 2 is also marked as an isolated flow, and a subsequent packet of the data flow 2 enters the first queue. As shown in FIG. 12B, a subsequent packet (a packet 5) of the data flow 2 enters the first queue. The node adds the packet count of the data flow 2 to the flow table, and a value of the packet count is 1 (the packet 5). After the packet 2 of the data flow 1 in the first queue is dequeued from the first queue, the node decreases the packet count corresponding to the data flow identification information 1 in the flow table by 1.

Figure 12C:
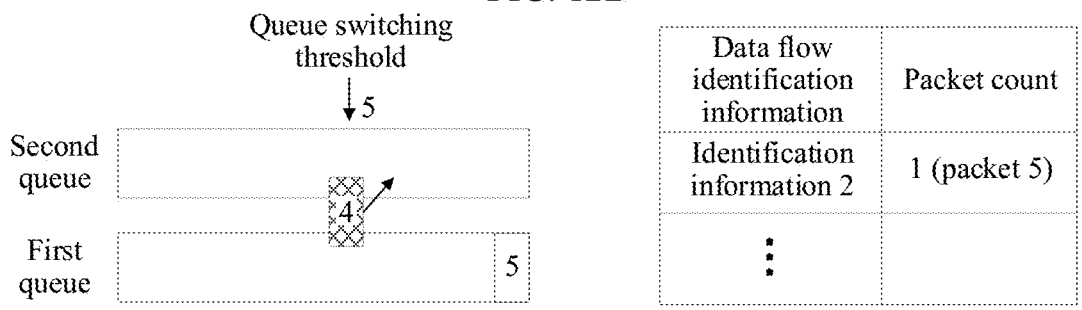

As shown in FIG. 12C, after all packets of the data flow 1 in the first queue are dequeued, the node deletes related information of the data flow identification information 1 from the flow table. That is, the data flow 1 is changed from an isolated flow to a non-isolated flow. Then, a subsequent packet (for example, a packet 4) of the data flow 1 enters the second queue.

Figure 12D:
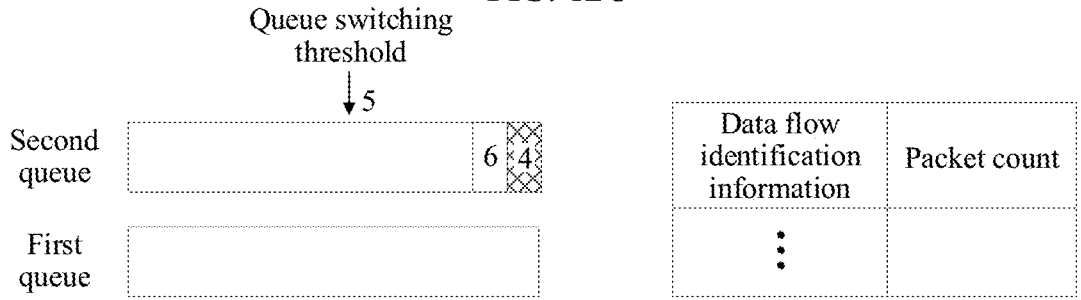

As shown in FIG. 12D, after all packets of the data flow 2 in the first queue are dequeued, the node deletes related information of the data flow 2 from the flow table. That is, the data flow 2 is changed from an isolated flow to a non-isolated flow. Then, a subsequent packet (for example, a packet 6) of the data flow 2 enters the second queue.

In other approaches, a node deletes all information from a flow table only when all packets in a first queue are dequeued, that is, the first queue is empty. To be more specific, in a process of FIG. 12A to FIG. 12C, even if the packets (the packet 2 and the packet 3) of the data flow 1 are dequeued from the first queue, because the packet 5 of the data flow 2 is still stored in the first queue, the node does not delete information about the data flow 1 from the flow table. In other words, the data flow 1 is still marked as an isolated flow, and the subsequent packet (for example, the packet 4) of the data flow 1 still enters the first queue. It can be learned that, in other approaches, a relatively long time may be needed to clear all packets in the first queue. If a packet of a data flow has been dequeued from the first queue, but the first queue is not empty, information about the data flow remains in the flow table. In the manner in other approaches, because a relatively long time may be needed to clear all packets in the first queue, the data flow cannot be restored to a non-isolated flow as early as possible. In addition, the information about the data flow remains in the flow table, thereby occupying a relatively large quantity of resources (for example, storage hardware resources) and wasting resources.

It can be learned from FIG. 12A to FIG. 12C that, in this embodiment of this application, the node updates, in the flow table, a packet count of each data flow in real time. After all packets of a data flow in the first queue are dequeued, related information of the data flow is deleted from the flow table. In other words, the data flow is restored from an isolated flow to a non-isolated flow, and a subsequent packet of the data flow enters the second queue.

In this example, if the flow table is the flow table shown in FIG. 11, after all packets of a data flow whose data flow identification information is "identification information 1" are dequeued from the first queue, in other words, a packet count corresponding to the identification information 1 of the data flow is 0, the node may change, in the flow table, an isolation identifier corresponding to the "identification information 1" from 1 into 0. In other words, the data flow is restored from an isolated flow to a non-isolated flow, and a subsequent packet of the data flow may enter the second queue.

Figure 13A:
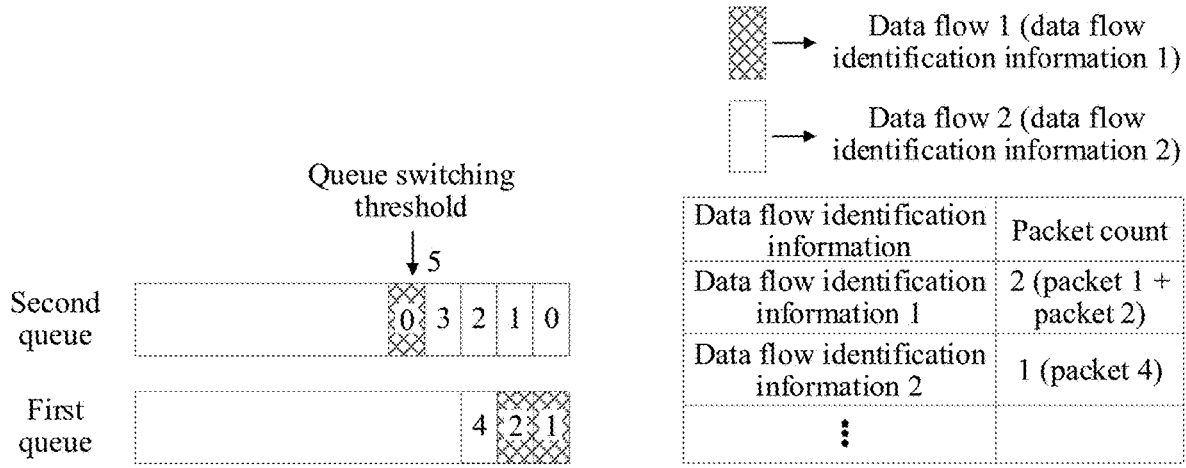
FIG. 13A, FIG. 13B, FIG. 13C, and FIG. 13D are schematic diagrams of a flow table update process according to an embodiment of this application.

Using the flow table shown in FIG. 10 as an example, for another example, referring to FIG. 13A, after packets (non-shaded boxes in the figure) (a packet 0 to a packet 3) of a data flow 2 enters the second queue, a packet (a shaded box in the figure) (a packet 0) of a data flow 1 enters the second queue. After the packet 0 of the data flow 1 enters the second queue, a packet count of packets currently in the second queue is equal to the queue switching threshold of the second queue (the queue switching threshold is 5). In this case, data flow identification information and a packet count of a data flow to which a subsequent packet entering the second queue belongs are added to the flow table. In other words, the data flow to which the subsequent packet of the second queue belongs is an isolated flow. For example, subsequent packets (for example, a packet 1 and a packet 2) of the data flow 1 enter the first queue, and the node adds data flow identification information 1 of the data flow 1 and a corresponding packet count to the flow table. To be more specific, the packet count corresponding to the data flow identification information 1 in the flow table is 2 (the packet 1+the packet 2). For another example, a subsequent packet (for example, a packet 4) of the data flow 2 enters the first queue, the node adds data flow identification information of the data flow 2 and a corresponding packet count to the flow table. To be more specific, the packet count corresponding to the data flow identification information 2 in the flow table is 1 (the packet 4).

Figure 13B:
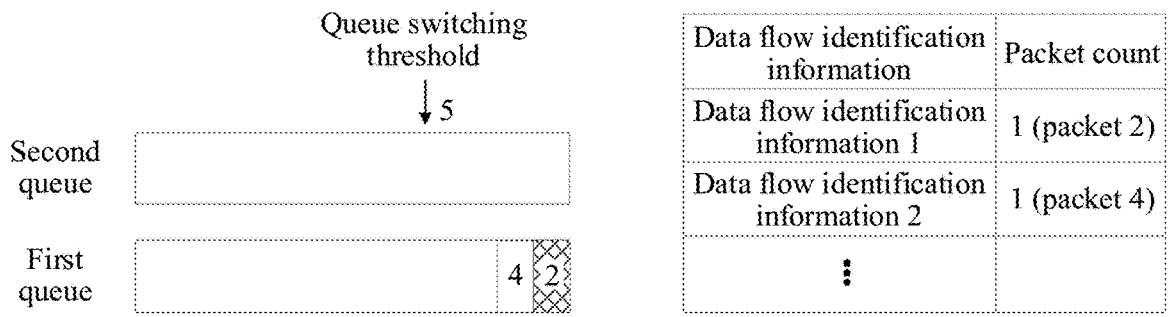

As shown in FIG. 13B, the packet 1 of the data flow 1 in the first queue is dequeued, and the node changes, in the flow table, the packet count corresponding to the data flow identification information 1 into 1 (the packet 2).

Figure 13C:
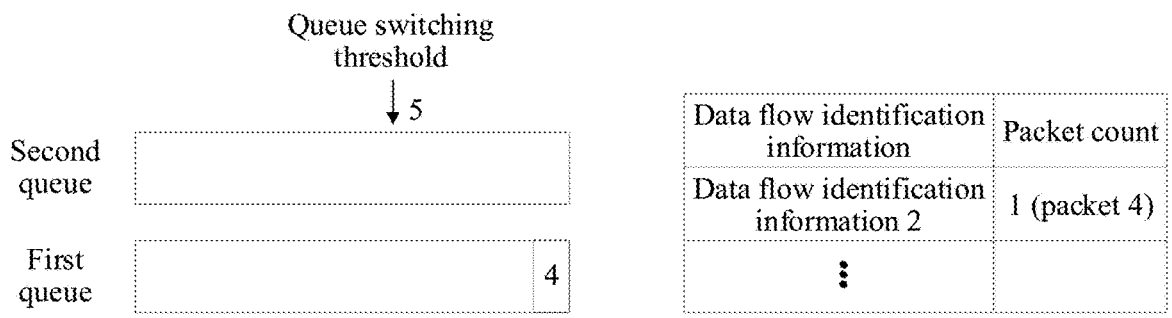

As shown in FIG. 13C, all packets of the data flow 1 in the first queue are dequeued, and the node deletes related information of the data flow 1 from the flow table. In other words, the node deletes the data flow identification information 1 and the packet count of the data flow 1, and the data flow 1 is restored from an isolated flow to a non-isolated flow.

Figure 13D:
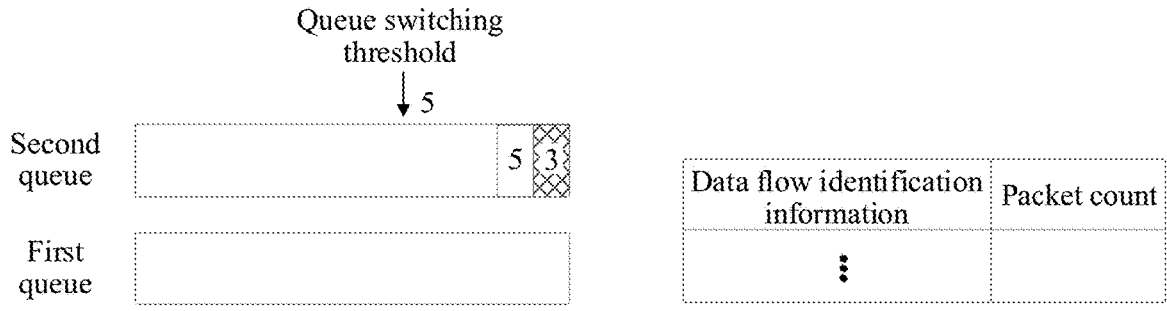

As shown in FIG. 13D, all packets of the data flow 2 in the first queue are dequeued, and the node deletes related information of the data flow 2 from the flow table. In other words, the node deletes the data flow identification information 2 and the packet count of the data flow 2, and the data flow 2 is changed from an isolated flow to a non-isolated flow. A subsequent packet (for example, a packet 3) of the data flow 1 enters the second queue, and a subsequent packet (for example, a packet 5) of the data flow 2 enters the second queue.

Figure 14A:
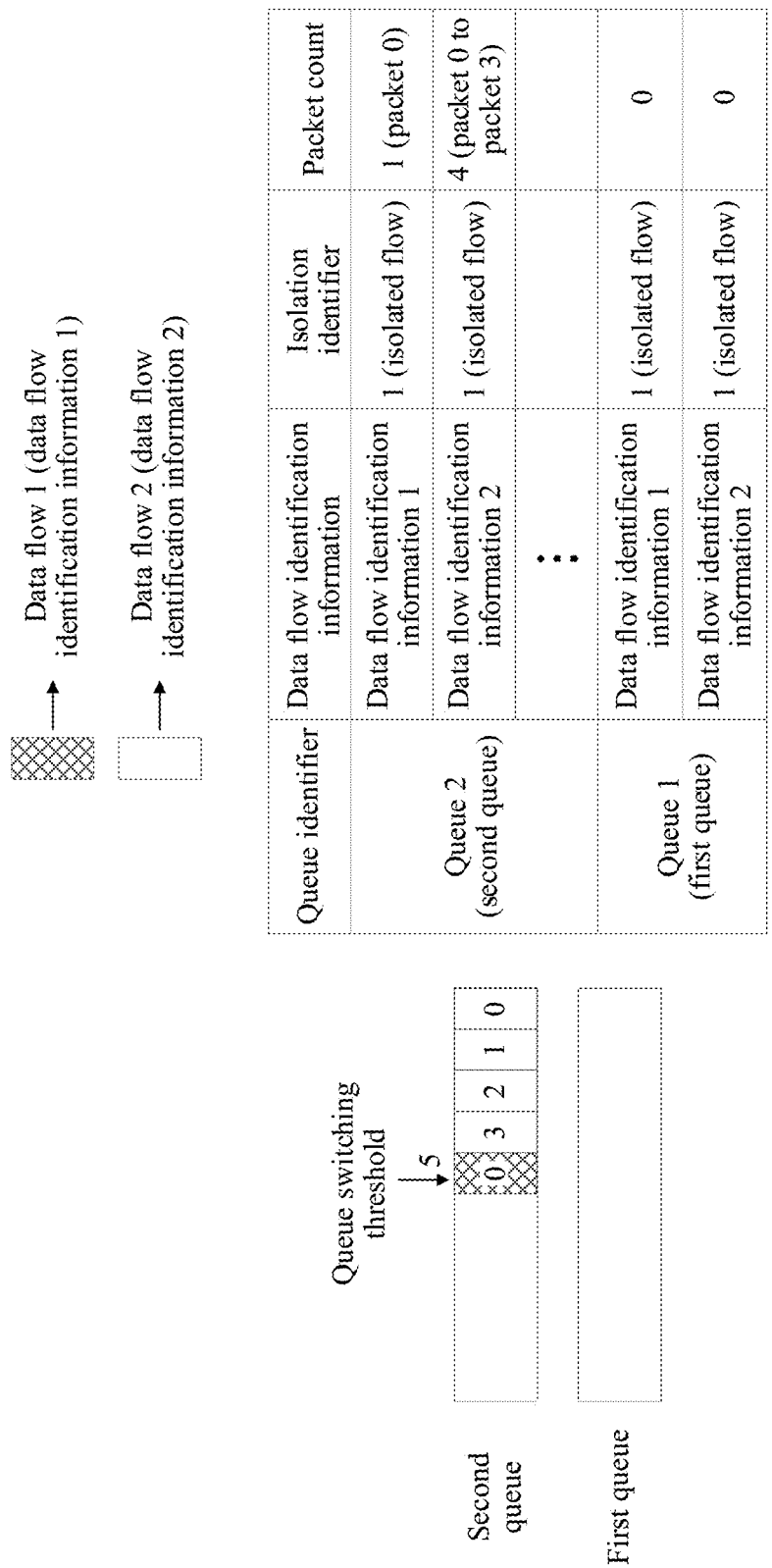
FIG. 14A, FIG. 14B, FIG. 14C, and FIG. 14D are schematic diagrams of a flow table update process according to an embodiment of this application.

Using the flow table shown in FIG. 11 as an example, for another example, as shown in FIG. 14A, after packets (non-shaded boxes in the figure) (a packet 0 to a packet 3) of a data flow 2 enters the second queue, a packet (a shaded box in the figure) (a packet 0) of a data flow 1 enters the second queue. In this case, a packet count of packets currently in the second queue reaches the queue switching threshold (the queue switching threshold is 5). In other words, a data flow to which a subsequent packet entering the second queue belongs needs to be marked as an isolated flow. In a flow table shown in FIG. 14A, isolation identifiers of the data flow 1 and the data flow 2 are 1 (an isolated flow). Therefore, a subsequent packet of the data flow 1 or the data flow 2 enters the first queue.

Figure 14B:
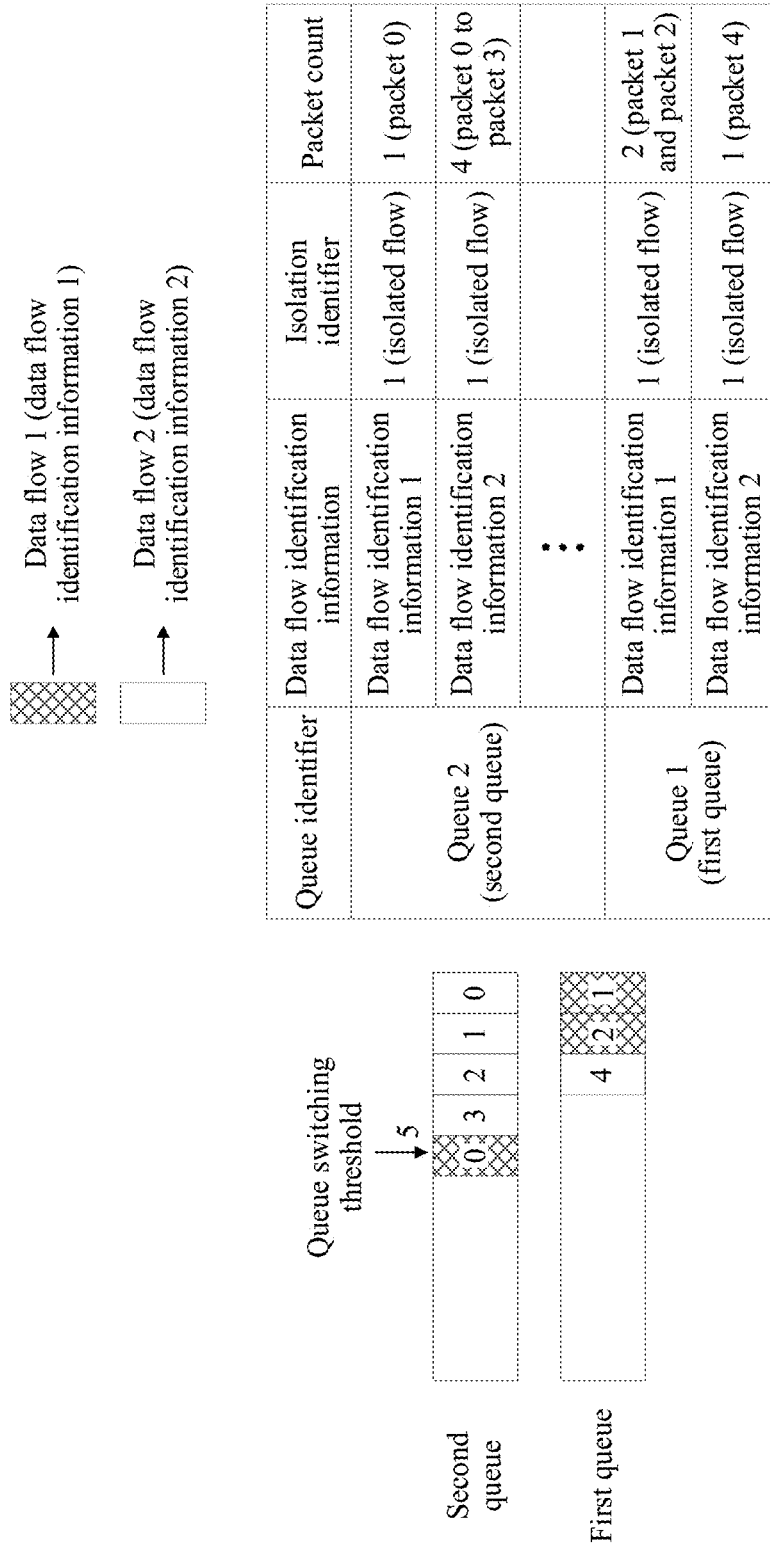

As shown in FIG. 14B, subsequent packets (a packet 1 and a packet 2) of the data flow 1 enter the first queue, and then a subsequent packet (a packet 4) of the data flow 2 enters the first queue. Therefore, in a flow table shown in FIG. 14B, in the first queue, a packet count of the data flow 1 is 2 (the packet 1 and the packet 2), and a packet count of the data flow 2 is 1 (the packet 1).

Figure 14C:
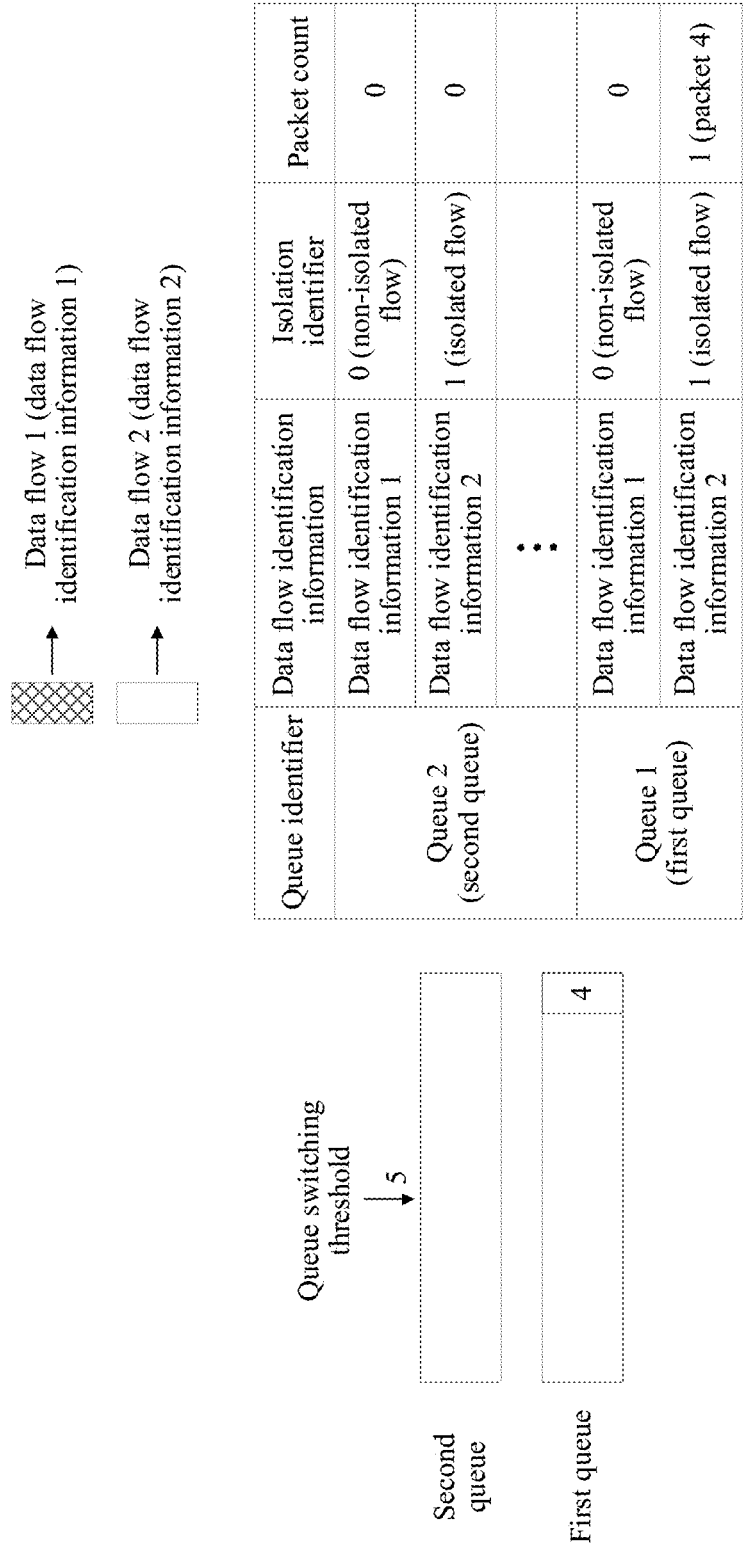

As shown in FIG. 14C, all packets of the data flow 1 in the first queue are dequeued. Therefore, in a flow table shown in FIG. 14C, a packet count of packets of the data flow 1 in the first queue is 0. In other words, the data flow 1 is restored from an isolated flow to a non-isolated flow. Therefore, in the flow table, the isolation identifier of the data flow 1 is changed from 1 (an isolated flow) into 0 (a non-isolated flow).

Figure 14D:
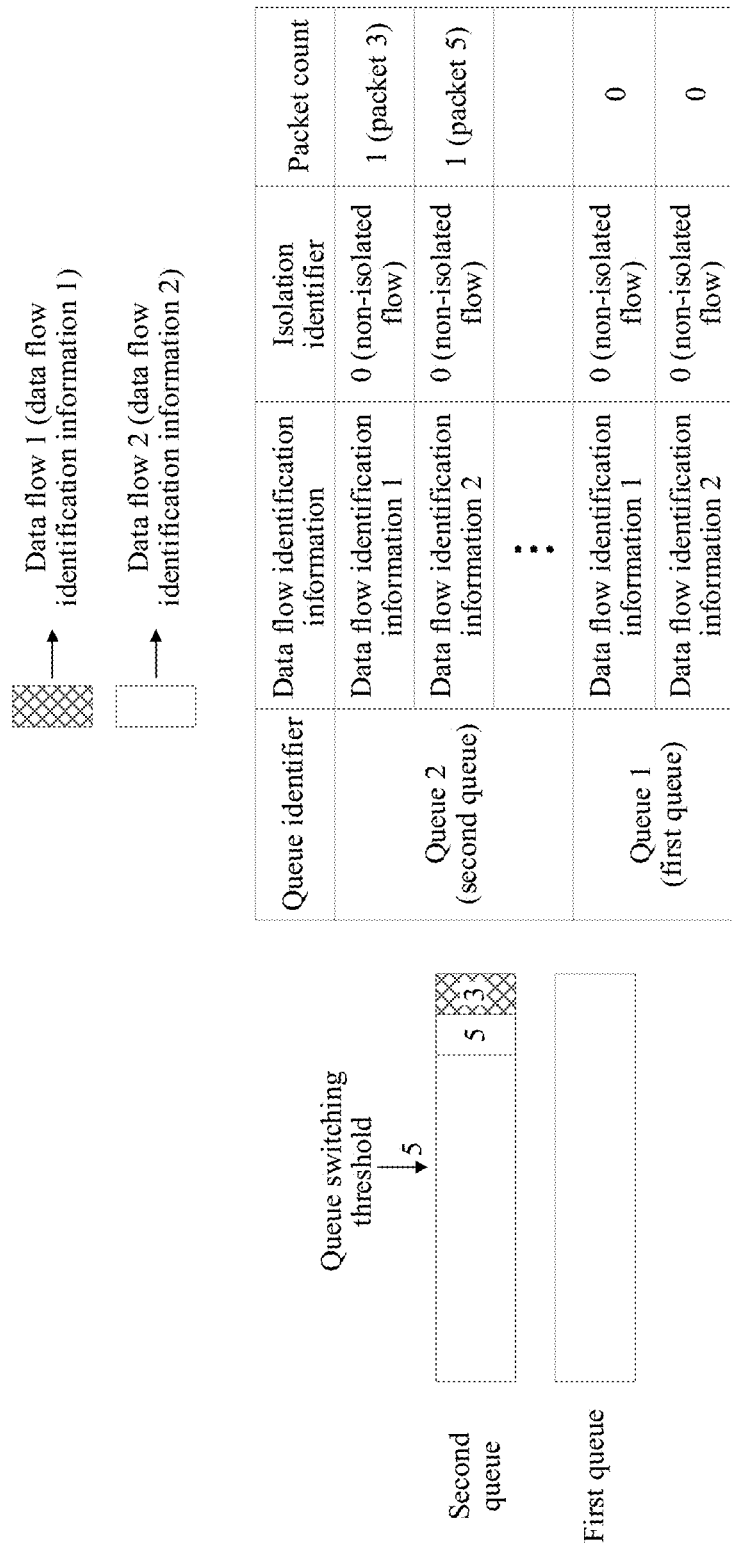

As shown in FIG. 14D, all packets of the data flow 2 in the first queue are dequeued. Therefore, in a flow table shown in FIG. 14D, a packet count of packets of the data flow 2 in the first queue is 0. In other words, the data flow 2 is restored from an isolated flow to a non-isolated flow. Therefore, in the flow table, the isolation identifier of the data flow 2 is changed from 1 (an isolated flow) into 0 (a non-isolated flow). Therefore, a subsequent packet (a packet 3) of the data flow 1 enters the second queue, and a subsequent packet (a packet 5) of the data flow 2 enters the second queue.

It can be learned from the foregoing descriptions that, in this embodiment of this application, the node may update the flow table in real time. After a packet of a data flow is dequeued, a packet count of the data flow is decreased. When a packet of a data flow is enqueued, a packet count of the data flow is increased. After all packets of a data flow in the first queue are dequeued, information about the data flow may be deleted from the flow table. This helps save hardware resources. In addition, the data flow is restored from an isolated flow to a non-isolated flow in a timely manner.

Implementations of this application may be randomly combined to achieve different technical effects.

In the foregoing embodiments provided in this application, the method provided in the embodiments of this application is described from a perspective of the node as an execution body. To implement the functions in the method provided in the embodiments of this application, the node may include a hardware structure and/or a software module, to implement the foregoing functions using the hardware structure, the software module, or a combination of the hardware structure and the software module. Whether a function of the foregoing functions is performed using a hardware structure, a software module, or a combination of a hardware structure and a software module depends on an application and a design constraint condition of the technical solution.

The following describes devices provided in the embodiments of the present disclosure with reference to the accompanying drawings.

Figure 15:
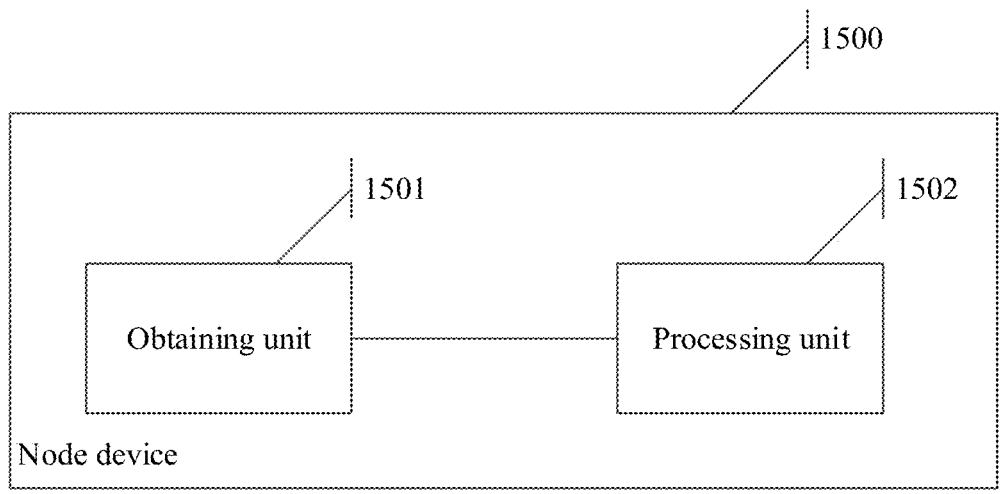
FIG. 15 is a schematic diagram of a structure of a node device according to an embodiment of this application.

FIG. 15 is a schematic diagram of a structure of a node device 1500. The node device 1500 may implement a function of the node device in the foregoing descriptions. The node device 1500 may include an obtaining unit 1501 and a processing unit 1502. The obtaining unit 1501 may be configured to perform S501 in the embodiment shown in FIG. 5, and/or configured to support another process of the technology described in this specification. The processing unit 1502 may be configured to perform S502 to S504 in the embodiment shown in FIG. 5, and/or configured to support another process of the technology described in this specification. All related content of the steps in the foregoing method embodiments may be cited in function descriptions of a corresponding function module, and details are not described herein.

Figure 16:
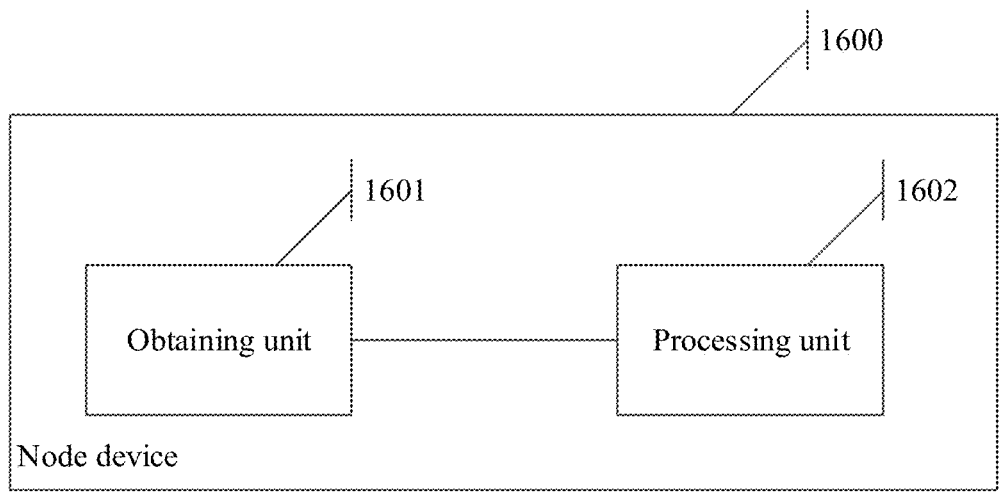
FIG. 16 is a schematic diagram of a structure of another node device according to an embodiment of this application.

FIG. 16 is a schematic diagram of a structure of a node device 1600. The node device 1600 may implement a function of the node device in the foregoing descriptions. The node device 1600 may include an obtaining unit 1601 and a processing unit 1602. The obtaining unit 1601 may be configured to perform S901 in the embodiment shown in FIG. 9, and/or configured to support another process of the technology described in this specification. The processing unit 1602 may be configured to perform S902 to S904 in the embodiment shown in FIG. 9, and/or configured to support another process of the technology described in this specification. All related content of the steps in the foregoing method embodiments may be cited in function descriptions of a corresponding function module, and details are not described herein.

In the embodiments of the present disclosure, the node device 1500 and the node device 1600 are presented by dividing function modules based on corresponding functions, or may be presented by dividing function modules in an integrated manner. The "module" or "unit" herein may be an application-specific integrated circuit (ASIC), a processor and a memory that execute one or more software or firmware programs, an integrated logic circuit, and/or another device that can provide the foregoing functions.

Figure 17:
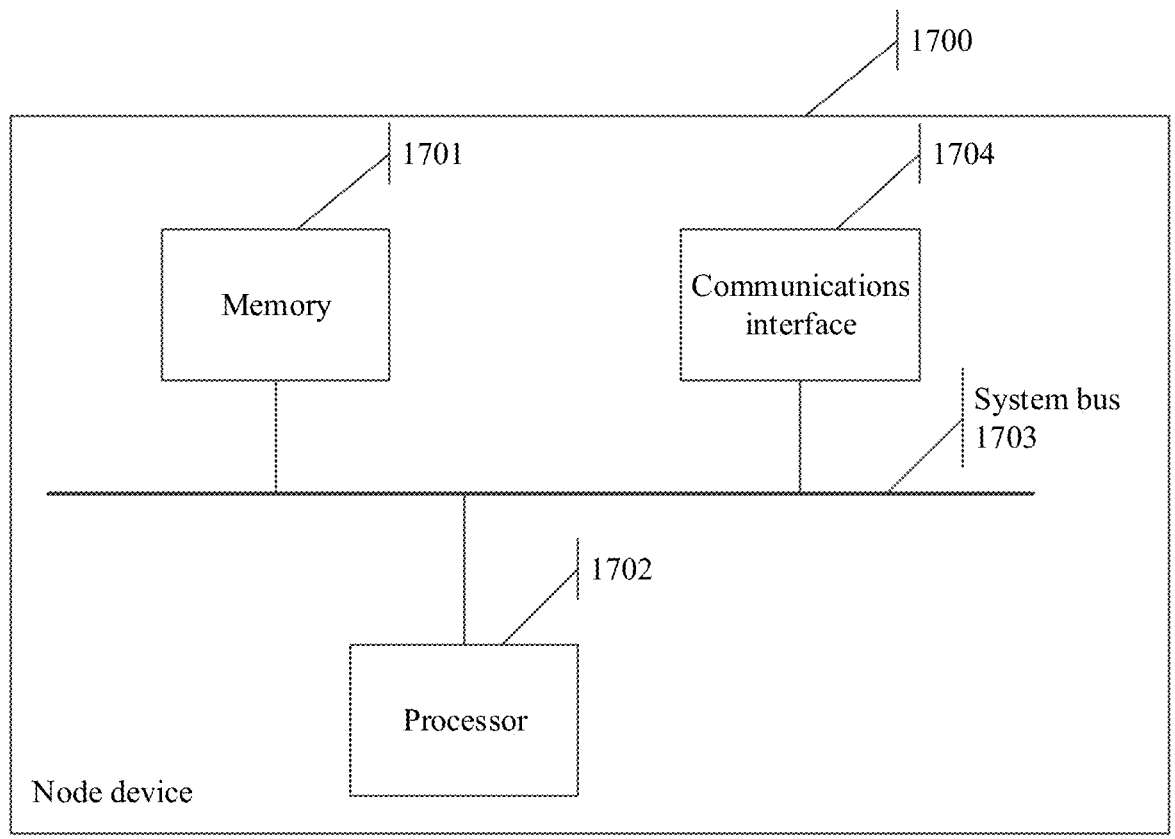
FIG. 17 is a schematic diagram of a structure of still another node device according to an embodiment of this application.

In a simple embodiment, a person skilled in the art may figure out that either the node device 1500 or the node device 1600 may be implemented using a structure shown in FIG. 17.

As shown in FIG. 17, a node device 1700 may include a memory 1701, a processor 1702, a system bus 1703, and a communications interface 1704. The processor 1702, the memory 1701, and the communications interface 1704 are connected using the system bus 1703. The memory 1701 is configured to store a computer executable instruction. When the node device 1700 runs, the processor 1702 executes the computer executable instruction stored in the memory 1701, such that the node device 1700 performs the steps of the method provided in the embodiment shown in FIG. 5 or the embodiment shown in FIG. 9. For a method, refer to the foregoing descriptions and related descriptions in the accompanying drawings. Details are not described herein. The communications interface 1704 may be a transceiver, or may be a receiver and a transmitter independent from each other.

Optionally, the node device 1700 may be a field-programmable gate array (FPGA), an ASIC, a system on chip (SoC), a central processing unit (CPU), a network processor (NP), a digital signal processor (DSP), or a micro controller unit (MCU), or a programmable controller (e.g., a programmable logic device (PLD)) or another integrated chip may be used. Alternatively, the node device 1700 may be an independent network element, for example, a network device or a terminal device.

An embodiment of the present disclosure further provides a computer storage medium. The storage medium may include a memory, and the memory may store a program. When the program is executed, all included steps performed by the node device recorded in the method embodiment shown in FIG. 5 are performed.

An embodiment of the present disclosure further provides a computer storage medium. The storage medium may include a memory, and the memory may store a program. When the program is executed, all included steps performed by the node device recorded in the method embodiment shown in FIG. 9 are performed.

An embodiment of the present disclosure further provides a computer program product. When the computer program product is run on a node device, the node device is enabled to perform all included steps performed by the node device recorded in the method embodiment shown in FIG. 5.

An embodiment of the present disclosure further provides a computer program product. When the computer program product is run on a node device, the node device is enabled to perform all included steps performed by the node device recorded in the method embodiment shown in FIG. 9.

The node device 1500 to the node device 1700 provided in the embodiments of the present disclosure may be configured to perform the foregoing packet control method. Therefore, for technical effects that can be achieved by the node device 1500 to the node device 1700, refer to the foregoing method embodiments. Details are not described herein.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a compact disc (CD)-read-only memory (CD-ROM), an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, such that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or any other programmable data processing device, such that a series of operations and steps are performed on the computer or the any other programmable device, thereby generating computer-implemented processing. Therefore, the instructions executed on the computer or the any other programmable device provide steps for implementing a function in one or more processes in the flowcharts and/or in one or more blocks in the block diagrams.

A person skilled in the art can make various modifications and variations to the embodiments of the present disclosure without departing from the spirit and scope of this application. This application is intended to cover these modifications and variations in the embodiments of the present disclosure provided that these modifications and variations fall within the scope of protection defined by the following claims and their equivalent technologies.

What is claimed is:

1. A packet control method applied to a node device comprising a first queue and a second queue, the packet control method comprising:
  marking a data flow as an isolated flow based on a total packet count of packets of the data flow that are in the first queue exceeding a queue switching threshold;
  obtaining, by the node device, a first packet of the data flow;
  determining, by the node device, whether the data flow is marked as the isolated flow; and
  when the data flow is marked as the isolated flow:
    controlling, by the node device, the first packet to enter the first queue and wait to be scheduled when at least one of the first queue or the second queue meets a first preset condition; and
    controlling, by the node device, the first packet to enter the second queue and wait to be scheduled when at least one of the first queue or the second queue meets a second preset condition.

2. The packet control method according to claim 1, wherein at least one of the first queue or the second queue meets the first preset condition when at least one of:
  a first packet count of to-be-scheduled packets currently in the first queue is less than or equal to a first threshold;
  the first packet count is less than the first threshold;
  a second packet count of to-be-scheduled packets currently in the second queue is less than or equal to a second threshold;
  the second packet count is less than the second threshold;
  a third packet count of to-be-scheduled packets currently in the second queue and the first queue is less than or equal to a third threshold; or
  the third packet count is less than the third threshold.

3. The packet control method according to claim 2, wherein at least one of the first threshold, the second threshold, or the third threshold is less than the queue switching threshold, and wherein a subsequent packet of the first queue enters the second queue when the first packet count exceeds the queue switching threshold.

4. The packet control method according to claim 1, wherein determining whether the data flow is marked as the isolated flow comprises:
  querying, in a flow table, whether the flow table includes data flow identification information of the data flow; and
  determining, by the node device, that the data flow is marked as the isolated flow when the flow table includes the data flow identification information.

5. The packet control method according to claim 4, wherein the flow table further comprises a current packet count of the data flow, and wherein after controlling the first packet to enter the second queue, the packet control method further comprises:
  increasing, by the node device, the current packet count in the flow table; and
  decreasing, by the node device, the current packet count after a packet of the data flow is dequeued from the second queue.

6. The packet control method according to claim 5, further comprising clearing, by the node device, the data flow identification information from the flow table when the current packet count is decreased to 0 in the flow table.

7. The packet control method according to claim 1, wherein determining whether the data flow is marked as the isolated flow comprises determining, by the node device, that the data flow is marked as the isolated flow when the node device finds, in a flow table, that an isolation identifier of the data flow is a first isolation identifier.

8. The packet control method according to claim 7, wherein the flow table further comprises a current packet count of the data flow, and wherein after controlling the first packet to enter the second queue, the packet control method further comprises:
  increasing, by the node device, the current packet count in the flow table; and
  decreasing, by the node device, the current packet count after a packet of the data flow is dequeued from the second queue.

9. The packet control method according to claim 8, further comprising changing, by the node device, the first isolation identifier to a second isolation identifier when the current packet count is decreased to 0 in the flow table, wherein the second isolation identifier indicates that the data flow is a non-isolated flow.

10. The packet control method according to claim 1, further comprising:
  determining, by the node device, that the data flow is marked as a non-isolated flow; and
  controlling, by the node device, the first packet to enter the first queue and wait to be scheduled after determining that the data flow is marked as the non-isolated flow.

11. A node device comprising a first queue and a second queue, the node device comprising:
  a receiver configured to obtain a first packet of a data flow; and
  a processor coupled to the receiver and configured to:
    mark the data flow as an isolated flow based on a total packet count of packets of the data flow that are in the first queue exceeding a queue switching threshold;
    determine whether the data flow is marked as isolated flow; and
    when the data flow is marked as the isolated flow:
      control the first packet to enter the first queue and wait to be scheduled when at least one of the first queue or the second queue meets a first preset condition; and
      control the first packet to enter the second queue and wait to be scheduled when at least one of the first queue or the second queue meets a second preset condition.

12. The node device according to claim 11, wherein at least one of the first queue or the second queue meets the first preset condition when at least one of:
  a first packet count of to-be-scheduled packets currently in the first queue is less than or equal to a first threshold;
  the first packet count is less than the first threshold;
  a second packet count of to-be-scheduled packets currently in the second queue is less than or equal to a second threshold;
  the second packet count is less than the second threshold;
  a third packet count of to-be-scheduled packets currently in the second queue and the first queue is less than or equal to a third threshold; or
  the third packet count is less than the third threshold.

13. The node device according to claim 12, wherein at least one of the first threshold, the second threshold, or the third threshold is less than the queue switching threshold, and wherein a subsequent packet of the first queue enters the second queue when the first packet count exceeds the queue switching threshold.

14. The node device according to claim 11, wherein the processor is configured to determine whether the data flow is marked as the isolated flow by:
  querying, in a flow table, whether the flow table includes data flow identification information of the data flow; and
  determining that the data flow is marked as the isolated flow when the flow table includes the data flow identification information.

15. The node device according to claim 11, wherein the processor is configured to determine that the data flow is marked as the isolated flow when the node device finds, in a flow table, that an isolation identifier of the data flow is a first isolation identifier.

16. The node device according to claim 15, wherein the flow table further comprises a current packet count of the data flow, and wherein after the node device controls the first packet to enter the second queue, the processor is further configured to:
  increase the current packet count in the flow table; and
  decrease the current packet count after a packet of the data flow is dequeued from the second queue.

17. The node device according to claim 16, wherein the processor is further configured to clear data flow identification information of the data flow from the flow table when the current packet count is decreased to 0 in the flow table.

18. The node device according to claim 16, wherein the processor is further configured to change the isolation identifier to a second isolation identifier when the current packet count is decreased to 0 in the flow table, and wherein the second isolation identifier indicates that the data flow is a non-isolated flow.

19. The node device according to claim 11, wherein the processor is further configured to:
  determine that the data flow is marked as a non-isolated flow; and
  control, based on determining that the data flow is marked as the non-isolated flow, the first packet to enter the first queue and wait to be scheduled after determining that the data flow is marked as the non-isolated flow.

20. A non-transitory computer storage medium comprising a computer program that, when executed by a processor on a node device comprising a first queue and a second queue, causes the node device to:
   mark a data flow as an isolated flow based on a total packet count of packets of the data flow that are in the first queue exceeding a queue switching threshold;
   obtain a first packet of the data flow;
   determine whether the data flow is marked as the isolated flow; and
   when the data flow is marked as the isolated flow:
      control the first packet to enter the first queue and wait to be scheduled when at least one of the first queue or the second queue meets a first preset condition; and
      control the first packet to enter the second queue and wait to be scheduled when at least one of the first queue or the second queue meets a second preset condition.

* * * * *